US008111306B2

(12) United States Patent
Kuruma et al.

(10) Patent No.: US 8,111,306 B2
(45) Date of Patent: Feb. 7, 2012

(54) APPARATUS, METHOD AND COMPUTER-READABLE MEDIUM FOR ELIMINATING DARK CURRENT COMPONENTS OF AN IMAGE PICKUP DEVICE

(75) Inventors: Daisuke Kuruma, Tokyo (JP); Nobuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 744 days.

(21) Appl. No.: 12/145,926

(22) Filed: Jun. 25, 2008

(65) Prior Publication Data

US 2009/0021606 A1    Jan. 22, 2009

(30) Foreign Application Priority Data

Jul. 17, 2007  (JP) ................................. 2007-185274

(51) Int. Cl.
*H04N 9/64* (2006.01)
(52) U.S. Cl. ........................................ 348/243; 348/244
(58) Field of Classification Search ................... 348/243
See application file for complete search history.

(56) References Cited

U.S. PATENT DOCUMENTS

| | | | | |
|---|---|---|---|---|
| 6,900,837 B2 * | 5/2005 | Muramatsu et al. | ........... | 348/243 |
| 6,982,705 B2 * | 1/2006 | Kunimi et al. | ................. | 345/204 |
| 7,218,351 B2 * | 5/2007 | Miyahara et al. | ............. | 348/313 |
| 7,245,323 B2 * | 7/2007 | Miyahara | ..................... | 348/316 |
| 7,295,238 B2 * | 11/2007 | Tanaka et al. | ................. | 348/316 |
| 2005/0083419 A1 * | 4/2005 | Honda et al. | .................. | 348/244 |
| 2005/0242380 A1 | 11/2005 | Suzuki et al. | | |
| 2006/0132625 A1 * | 6/2006 | Mori | .............................. | 348/241 |
| 2007/0076107 A1 * | 4/2007 | Nishimura | .................... | 348/294 |
| 2010/0053380 A1 * | 3/2010 | Ise | ................................. | 348/241 |

FOREIGN PATENT DOCUMENTS

| | | |
|---|---|---|
| JP | 6-78224 | 3/1994 |
| JP | 2005-130045 | 5/2005 |
| JP | 2005-130331 | 5/2005 |
| JP | 2005-223707 | 8/2005 |
| JP | 2005-312805 | 11/2005 |
| JP | 2006-25147 | 1/2006 |
| JP | 2007-6538 | 1/2007 |
| JP | 2007-28151 | 2/2007 |

OTHER PUBLICATIONS

U.S. Appl. No. 12/763,456, filed Apr. 20, 2010, Ueda, et al.

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

An image pickup apparatus includes an image pickup device including plural imaging planes each having different dark current characteristics, each of the imaging planes having an effective image area and an corresponding optical black (OPB) area. The image pickup apparatus also includes a memory that stores a dark current data table including difference data between dark current values pre-measured at upper and lower areas of the effective image area of each of the imaging planes and dark current values pre-measured at corresponding upper and lower areas of the OPB area. The image pickup apparatus further includes an image processing unit to calculate estimate dark current values for the effective image area based on the dark current data table and actual dark current values measured in the OPB area for each of the imaging planes, and eliminates the dark current components for the effective imaging areas.

13 Claims, 12 Drawing Sheets

FIG. 4

| | SHUTTER SPEED | 1/8000~ 1/100s | 1/100~1s | 1~4s | 4~8s | 8~16s | 16~24s | 24~30s |
|---|---|---|---|---|---|---|---|---|
| T=0~ 20°C | α0 | 50 | 51 | 54 | 56 | 58 | 60 | 65 |
| | α1 | 80 | 82 | 88 | 92 | 96 | 100 | 110 |
| | β0 | 20 | 21 | 24 | 26 | 28 | 30 | 35 |
| | β1 | 40 | 42 | 48 | 52 | 56 | 60 | 65 |
| | a0 | 170 | 190 | 210 | 230 | 250 | 270 | 290 |
| | b0 | 150 | 170 | 190 | 210 | 230 | 250 | 270 |
| T=20~ 40°C | α0 | 70 | 74 | 78 | 85 | 90 | 98 | 110 |
| | α1 | 105 | 109 | 114 | 120 | 126 | 135 | 142 |
| | β0 | 40 | 42 | 45 | 48 | 51 | 55 | 60 |
| | β1 | 75 | 77 | 80 | 83 | 86 | 90 | 95 |
| | a0 | 210 | 230 | 250 | 270 | 290 | 310 | 330 |
| | b0 | 170 | 190 | 210 | 230 | 250 | 270 | 290 |
| T=40~ 60°C | α0 | 100 | 105 | 110 | 118 | 125 | 133 | 140 |
| | α1 | 140 | 145 | 150 | 158 | 165 | 173 | 180 |
| | β0 | 70 | 73 | 76 | 80 | 85 | 91 | 97 |
| | β1 | 95 | 98 | 103 | 108 | 114 | 120 | 127 |
| | a0 | 300 | 320 | 350 | 390 | 440 | 500 | 570 |
| | b0 | 250 | 270 | 300 | 340 | 390 | 450 | 520 |

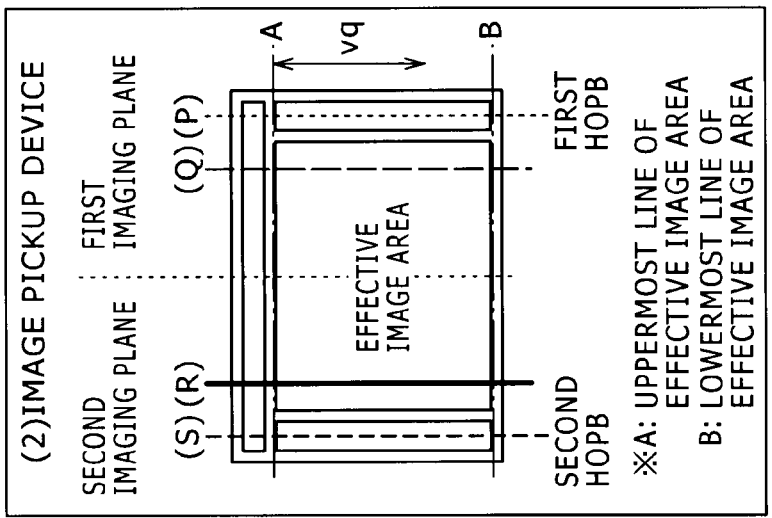
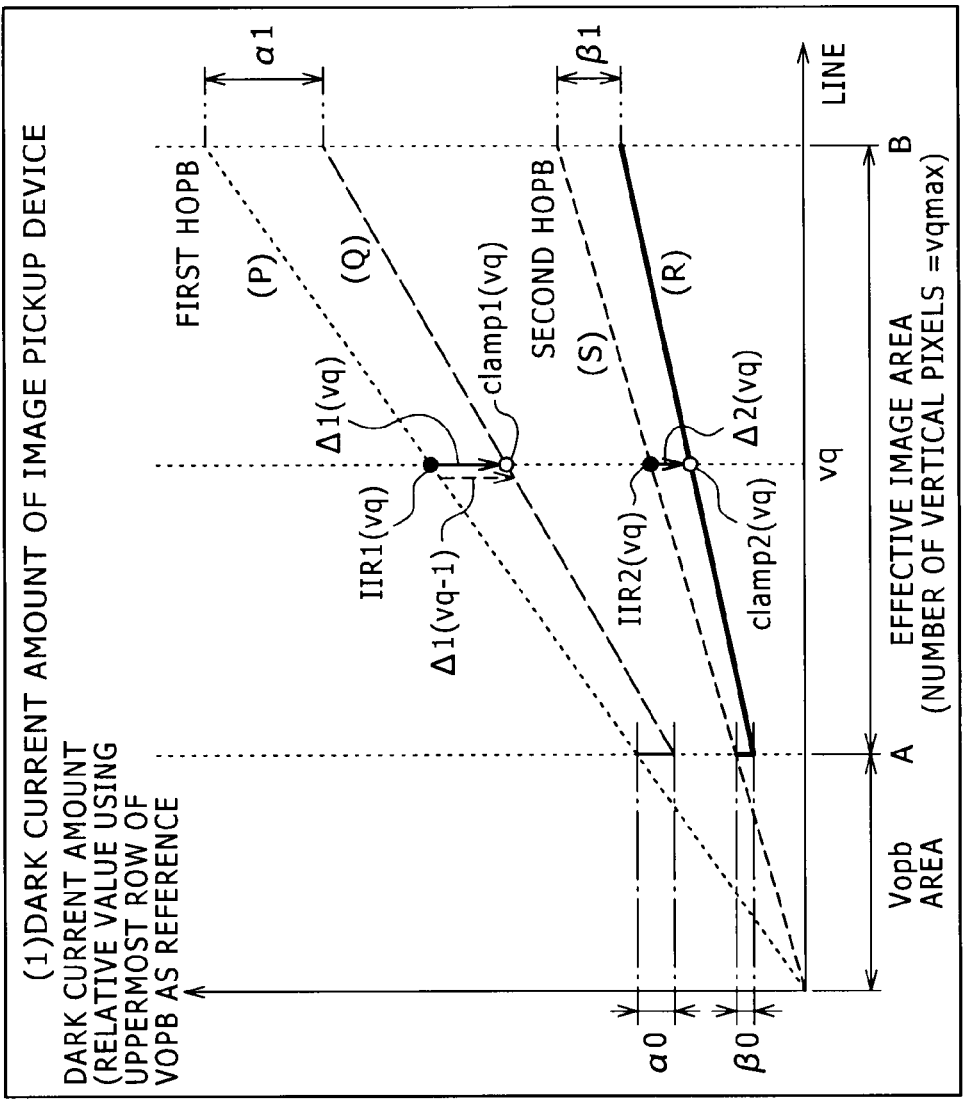
FIG. 5A
FIG. 5B

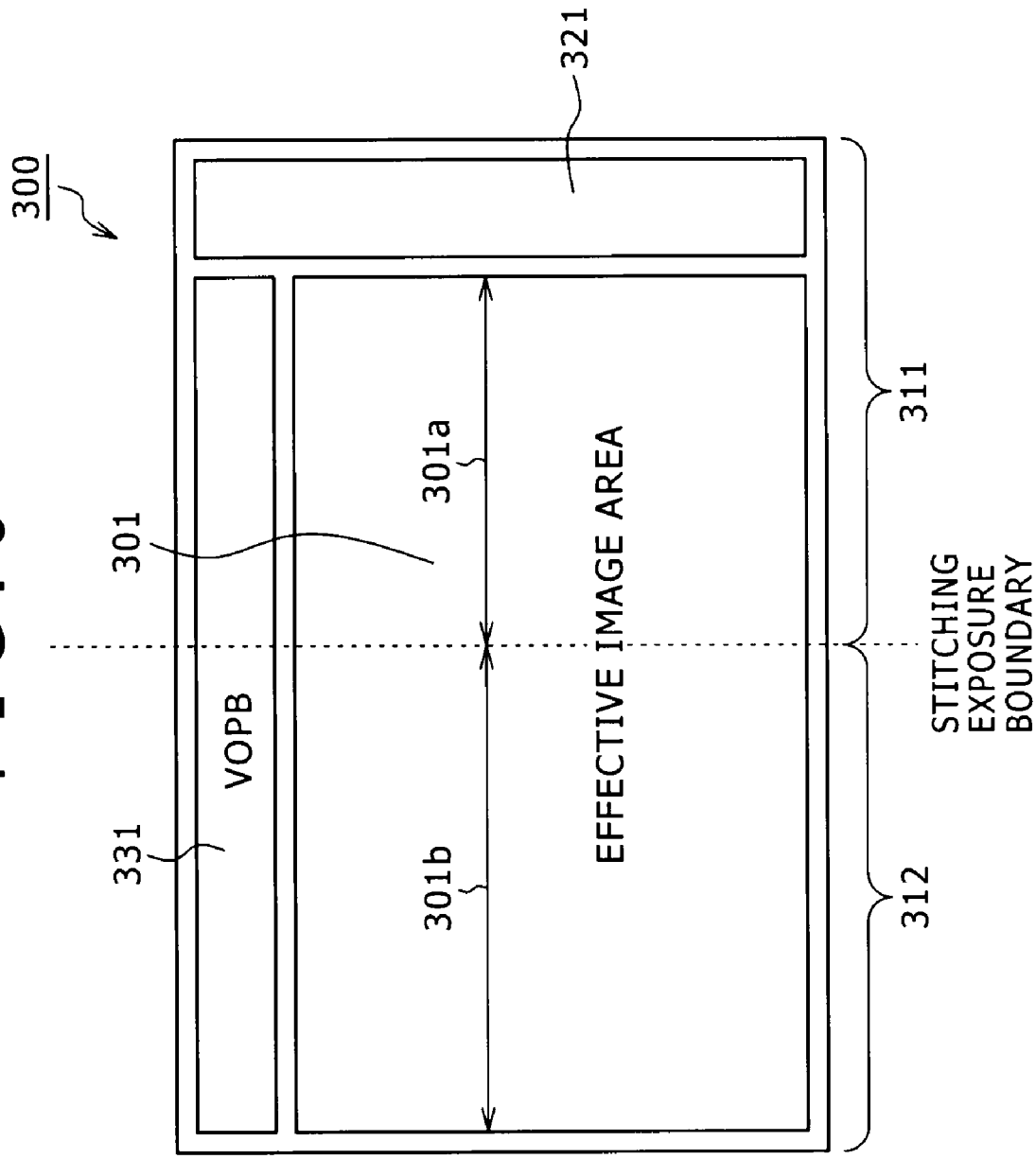

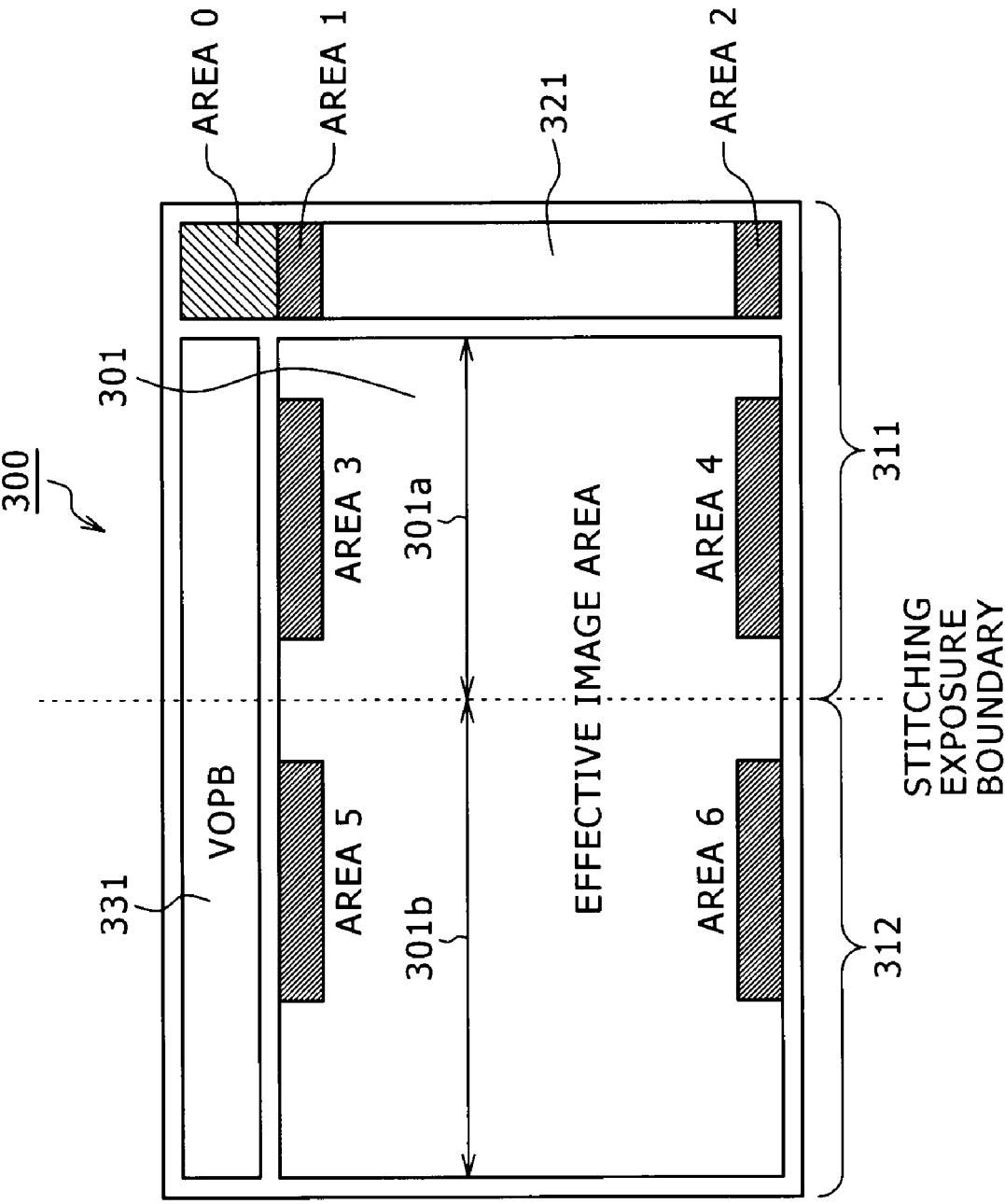

FIG. 8

| SHUTTER SPEED | | 1/8000~1/100s | 1/100~1s | 1~4s | 4~8s | 8~16s | 16~24s | 24~30s |
|---|---|---|---|---|---|---|---|---|
| T=0~20°C | α0 | 50 | 51 | 54 | 56 | 58 | 60 | 65 |
| | α1 | 80 | 82 | 88 | 92 | 96 | 100 | 110 |
| | β0 | 20 | 21 | 24 | 26 | 28 | 30 | 35 |
| | β1 | 40 | 42 | 48 | 52 | 56 | 60 | 65 |
| | a0 | 170 | 190 | 210 | 230 | 250 | 270 | 290 |
| T=20~40°C | α0 | 70 | 74 | 78 | 85 | 90 | 98 | 110 |
| | α1 | 105 | 109 | 114 | 120 | 126 | 135 | 142 |
| | β0 | 40 | 42 | 45 | 48 | 51 | 55 | 60 |
| | β1 | 75 | 77 | 80 | 83 | 86 | 90 | 95 |
| | a0 | 210 | 230 | 250 | 270 | 290 | 310 | 330 |
| T=40~60°C | α0 | 100 | 105 | 110 | 118 | 125 | 133 | 140 |
| | α1 | 140 | 145 | 150 | 158 | 165 | 173 | 180 |
| | β0 | 70 | 73 | 76 | 80 | 85 | 91 | 97 |
| | β1 | 95 | 98 | 103 | 108 | 114 | 120 | 127 |
| | a0 | 300 | 320 | 350 | 390 | 440 | 500 | 570 |

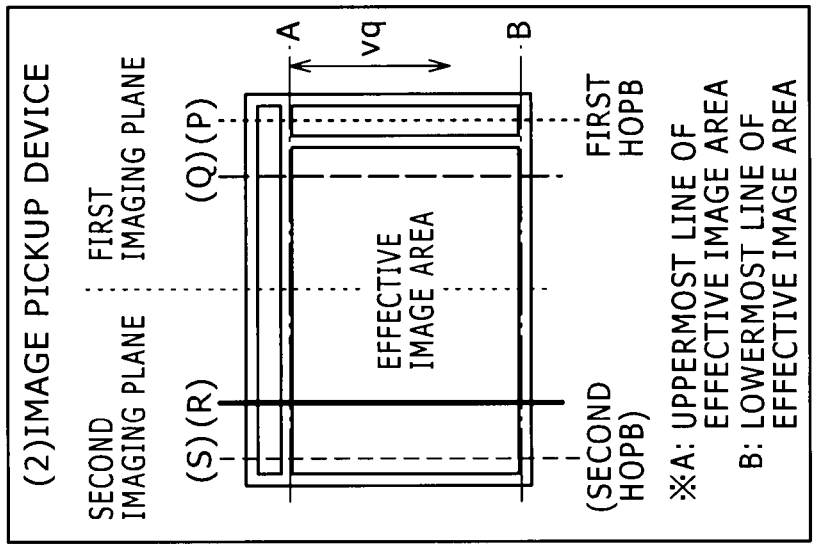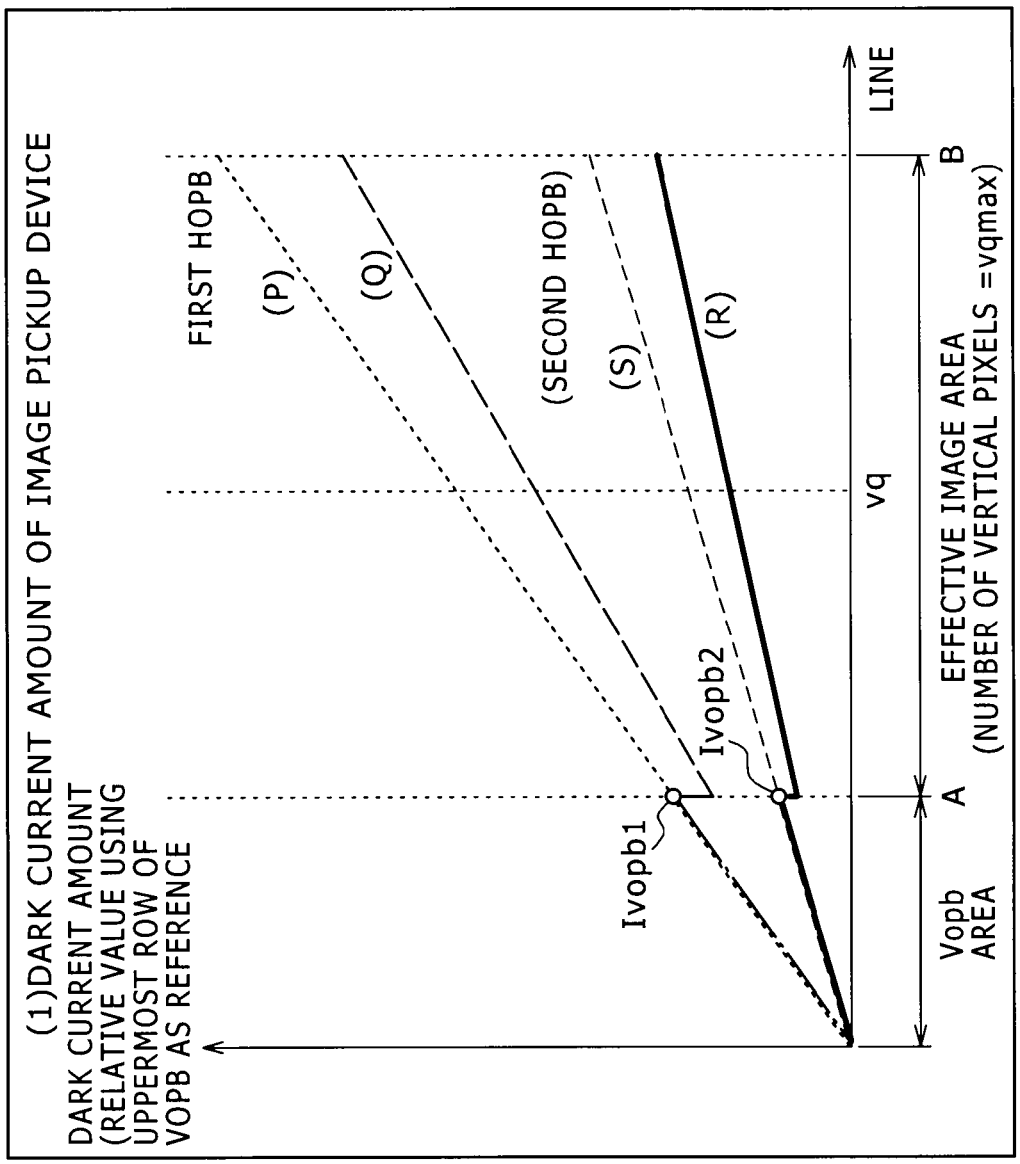
FIG. 9A
FIG. 9B

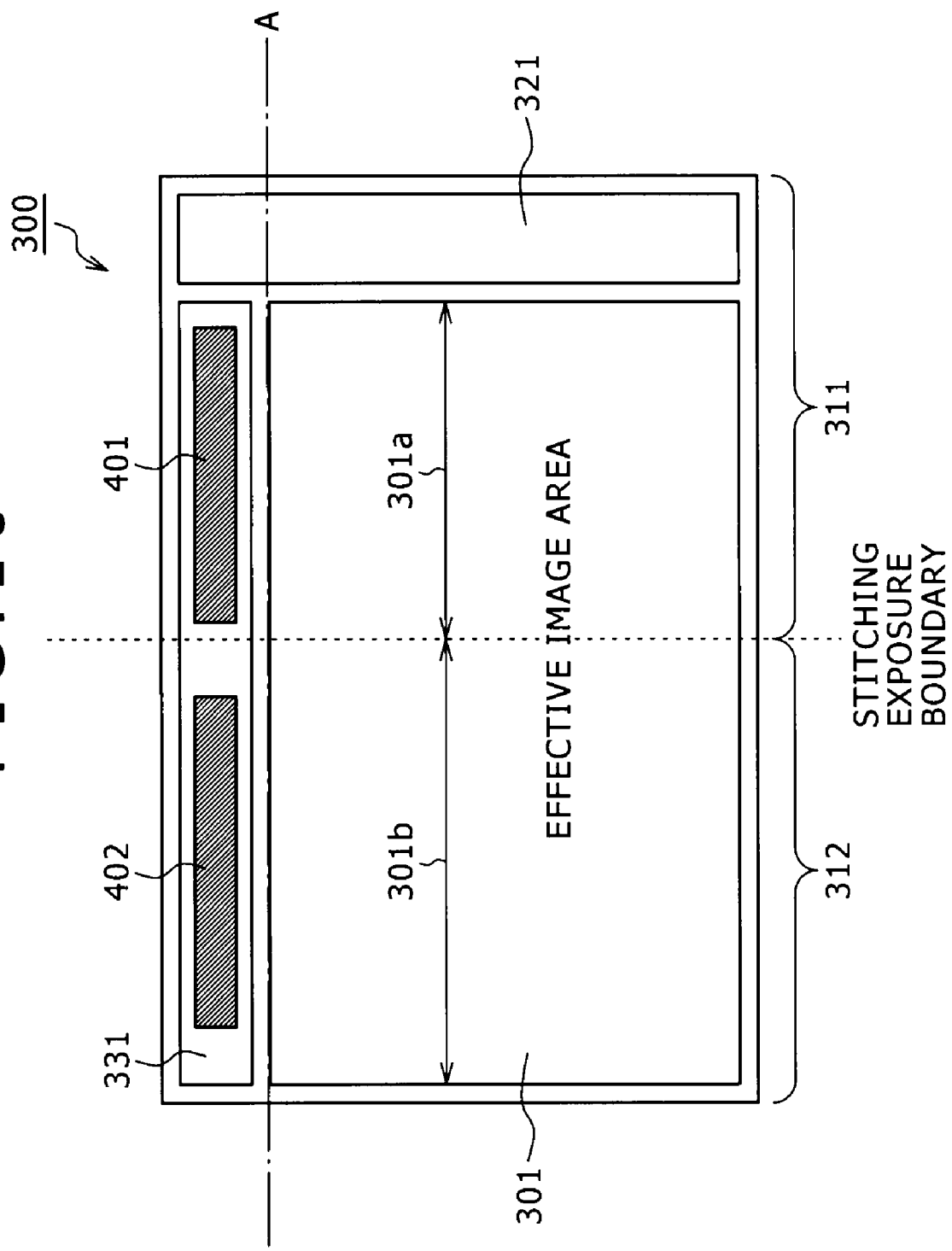

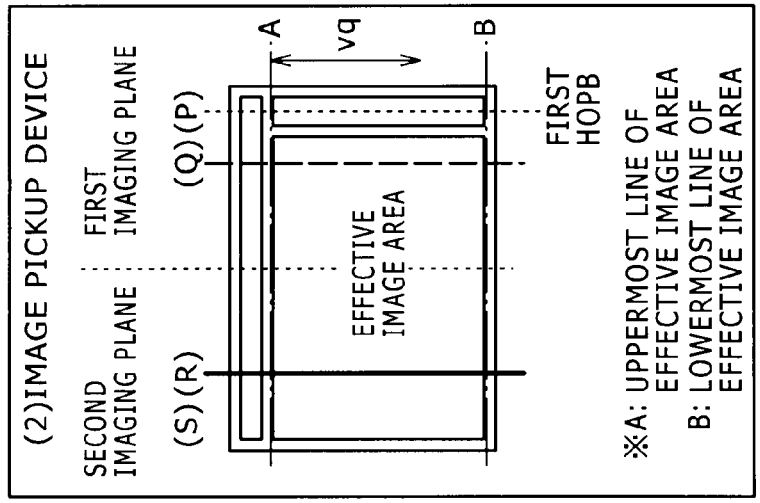
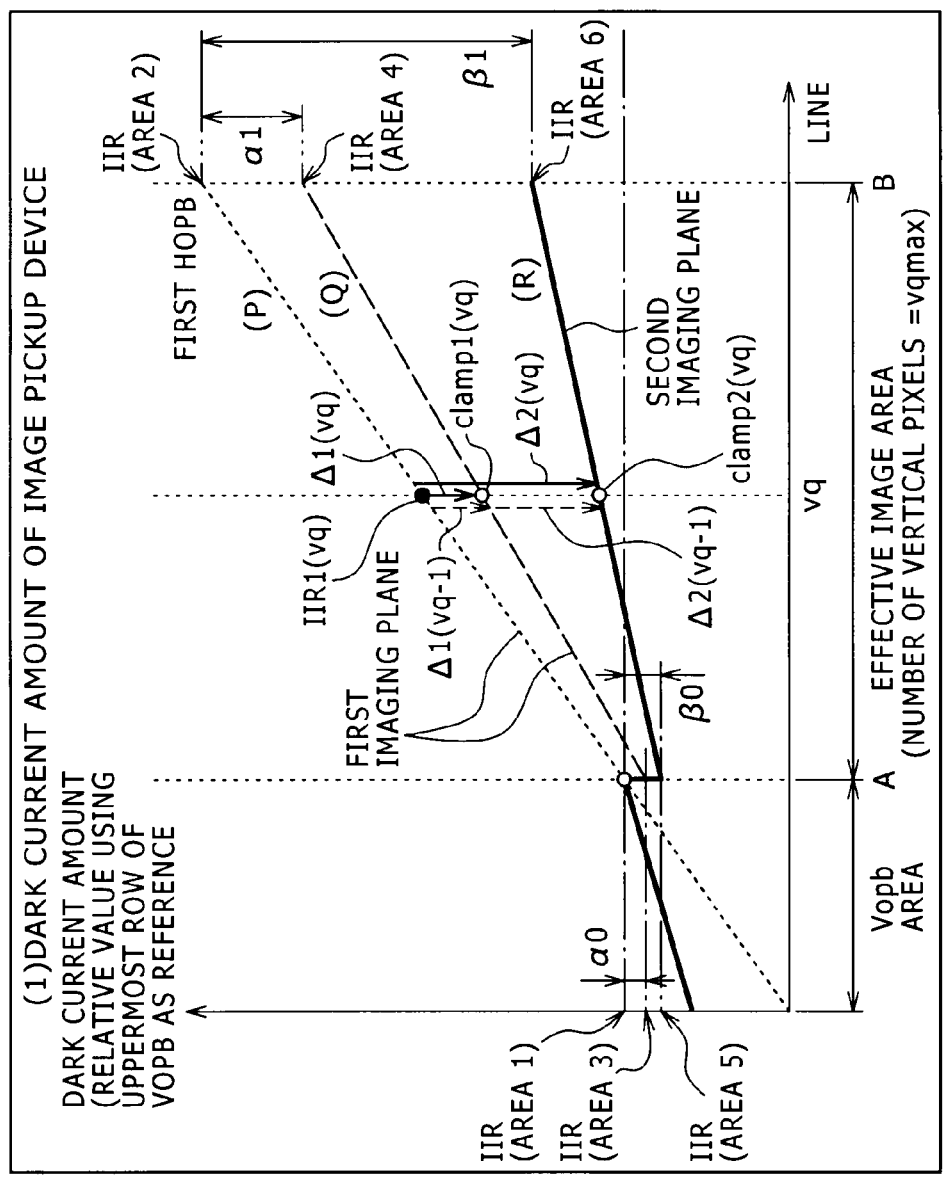

APPARATUS, METHOD AND COMPUTER-READABLE MEDIUM FOR ELIMINATING DARK CURRENT COMPONENTS OF AN IMAGE PICKUP DEVICE

CROSS-REFERENCE TO RELATED APPLICATIONS

The present application claims benefit of priority of Japanese patent Application No. 2007-185274 filed in the Japanese Patent Office on Jul. 17, 2007, the entire disclosure of which is incorporated herein by reference.

BACKGROUND OF THE INVENTION

1. Field of the Invention

The present invention relates to an image pickup apparatus, an image processing method and a computer program. More particularly, the present invention relates to an image pickup apparatus such as a digital camera which performs a process of eliminating dark current components of an image pickup device, an image processing method and a computer program.

2. Description of Related Art

An image pickup apparatus such as a digital camera has an image pickup device such as complementary metal oxide semiconductor (CMOS) and charge coupled device (CCD), and is configured to generate a photographed image by a process of converting optical signals into electrical signals at the image pickup device.

Image pickup devices equipped in many general cameras are small image pickup devices smaller than a 35 mm film (36×24 mm) for example. However, in recent years, cameras have been developed which are equipped with a large image pickup device having an increased number of effective pixels and enable to photograph high quality images. For example, there is a camera equipped with a large image pickup device such as CMOS and CCD having the same size as a 35 mm film (36×24 mm) for example.

An image pickup device such as CMOS and CCD is made of semiconductor, and is required to form a dense integrated circuit on a silicon substrate by semiconductor manufacture processes including an exposure process. Specifically, a mask pattern of a semiconductor integrated circuit is reduced in scale by utilizing a stepper, and printed on a silicon substrate. However, there is a limit in the size of a stepper, and when a large image pickup device such CMOS and CCD having the same size as a 35 mm film (36×24 mm) is to be manufactured, the image pickup device are divided into a plurality of areas to perform an exposure process in the unit of each divided area, and an integrated circuit of the whole image pickup device is completed by a plurality of exposure processes. Thus, the manufacture of a large image pickup device requires an exposure process for each divisional area.

However, an image pickup device manufactured by a divisional exposure process (step-and-repeat exposure process) causes a problem that the characteristics of each divisional area subjected to each exposure process become different. For example, if an image pickup device is manufactured by dividing it into right and left halves, there is a difference between a dark current of a left image pickup device and a dark current of a right image pickup device, causing a problem that right and left images are become different distinctly.

Generally, in a small image pickup device manufactured by a single exposure process, a dark current in an optical black (OPB) area formed in a peripheral area of the image pickup device is measured, and a dark current is eliminated by a dark current eliminating process on the basis of the measured value.

An image pickup device has a structure having an effective image area for acquiring image data and an optical black (OPB) area formed in a peripheral area of the effective image area and not receiving light. A dark current in the OPB area is measured, and a dark current in the effective image area for receiving light corresponding a photographed image is estimated to eliminate the dark current. This configuration is disclosed, for example, in Japanese Unexamined Patent Application Publication No. 2005-312805(Patent Document 1).

An amount of generation of dark current changes also with a temperature, and a dark current eliminating process considering the temperature characteristics is also being studied. For example, Japanese Unexamined Patent Application Publication No. 2005-130045(Patent Document 2) discloses a configuration that a dark current value or dark current noises are measured by using an OPB area and compared with dark current value data obtained beforehand by considering temperature characteristics to estimate a temperature of the image pickup device, and an image correction process (such as gain setting) is executed in accordance with the estimated temperature.

However, an image correction process by an earlier developed dark current elimination is fundamentally a process compatible with a small image pickup device manufactured by a single manufacture process, and does not realize a correction process compatible with a large image pickup device having device areas with different characteristics caused by a plurality of manufacture processes described above.

SUMMARY OF THE INVENTION

Accordingly, it is desirable to provide an image pickup device, an image processing apparatus and a computer program capable of generating a high quality image by eliminating a dark current in each divisional area in accordance with photographed data photographed, for example, with an image pickup device having areas with different characteristics because of a manufacture process in the unit of a divided area.

In accordance with a first aspect of the present invention, there is provided an image pickup apparatus including an image pickup device which includes a plurality of imaging planes each having different dark current characteristics, and an image processing unit for receiving a signal from the image pickup device and performing an image generating process. The image processing unit calculates a dark current estimated to be generated in each of the plurality of imaging planes, independently for each imaging plane, and performs a dark current eliminating process on the basis of a dark current value calculated for each imaging plane.

The image pickup device may be by a divisional exposure process and include the plurality of imaging planes each corresponding to each exposure area unit. The image processing unit may calculate independently for each imaging plane a dark current estimated to be generated in each of the plurality of imaging planes corresponding to each exposure area unit, and perform the dark current eliminating process on the basis of a dark current value calculated for each imaging plane.

The image pickup device may includes an effective image area for acquiring photographed image data and an optical black (OPB) area having lines corresponding to respective lines constituting the effective image area, respectively in each of the plurality of imaging planes each having different dark current characteristics. The image processing unit may calculate a dark current value of the effective image area in each imaging plane by using a dark current measured in the OPB area set to the same imaging plane as a reference value, and perform the dark current eliminating process for the effective image area of each imaging plane by using the calculation result.

The image pickup apparatus may further includes a storage unit storing a dark current data table for recording data including difference data based upon dark current measurement values between the effective image area in upper and lower areas in each imaging plane having different dark current characteristics and the OPB area. The image processing unit may perform the dark current eliminating process for the effective image area of each imaging plane, by referring to the data recorded in the dark current data table.

The dark current data table may be a table for recording a plurality of data sets based on measurement values obtained under a plurality of photographing conditions changing at least either a shutter speed or a temperature. The image processing unit may select a data set having conditions approximate to conditions during photographing from a plurality of data sets recorded in the dark current data table, on the basis of shutter speed or temperature information during photographing, and perform the dark current eliminating process for the effective image area in each imaging plane by referring to the selected data set.

The image pickup device may be composed of CMOS. The image processing unit may read signals from the image pickup device composed of CMOS line-sequentially from an upper line to a lower line, on an assumption that a dark current contained in a read signal increases in proportion to transfer from an upper area to a lower area of the image pickup device, calculate a dark current value of the effective image area in each imaging plane, by using a dark current measured in the OPB area set to the same imaging plane as a reference value, and perform the dark current eliminating process for the effective image area in each imaging plane by using a calculation result.

The image processing unit may read signals from the image pickup device composed of CMOS line-sequentially from an upper line to a lower line, calculate a dark current contained in signals corresponding to each line of the effective image area from which the signals are read, by using a dark current value of the OPB area at the same line or a line one line before as a reference value, and perform the dark current eliminating process for the effective image area in each imaging plane by using a calculation result.

The image processing unit may acquire a dark current value of the OPB area at each line by utilizing a measurement result by an integrator adopting an infinite impulse response (IIR) filter.

The image pickup device may include: an effective image area for acquiring photographed image data, formed in each of the plurality of imaging planes each having different dark current characteristics; an H-optical black (HOPB) area having lines corresponding to respective lines constituting the effective image area, at least in a same imaging plane as each of the plurality of imaging planes; and a V-optical black (VOPB) area set to an area containing each of the plurality of imaging planes. The image processing unit may divide the VOPB area into areas corresponding to each of the plurality of imaging planes, measured a dark current of each divided VOPB area, and by adopting dark current values corresponding to the plurality of VOPB areas corresponding to the plurality of imaging planes and a dark current value measured in the at least one HOPB area, perform the dark current a dark current eliminating process for the effective image area of each imaging plane.

The image pickup apparatus may includes a storage unit storing a dark current data table for recording data including difference data based upon dark current measurement values between the effective image area in upper and lower areas in each imaging plane having different dark current characteristics and the HOPB area. The image processing unit may perform the dark current eliminating process for the effective image area of each imaging plane, by referring to the data recorded in the dark current data table.

The dark current data table may be a table for recording a plurality of data sets based on measurement values obtained under a plurality of photographing conditions changing at least either a shutter speed or temperature. The image processing unit may select a data set having conditions approximate to conditions during photographing from a plurality of data sets recorded in the dark current data table, on the basis of shutter speed or temperature information during photographing, and perform the dark current eliminating process for the effective image area in each imaging plane by referring to the selected data set.

The image pickup device may be composed of CMOS. The image processing unit may read signals from the image pickup device composed of CMOS line-sequentially from an upper line to a lower line, on an assumption that a dark current contained in a read signal increases in proportion to transfer from an upper area to a lower area of the image pickup device, calculates a dark current value of the effective image area in each imaging plane, by using a dark current measured in the HOPB area set to the same imaging plane as a reference value, and perform the dark current eliminating process for the effective image area in each imaging plane by using a calculation result.

The image processing unit may read signals from the image pickup device composed of CMOS line-sequentially from an upper line to a lower line, calculates a dark current contained in signals corresponding to each line of the effective image area from which the signals are read, by using a dark current value of the HOPB area at the same line or a line one line before as a reference value, and perform the dark current eliminating process for the effective image area in each imaging plane by using a calculation result.

The image processing unit may be configured to obtain a dark current value of the OPB area at each line by utilizing a measurement result by an integrator adopting an infinite impulse response (IIR) filter.

In accordance with a second aspect of the present invention, there is provided an image processing method to be executed by an image processing apparatus, including, in an image processing unit, an image processing step of receiving a signal acquired by an image pickup device including a plurality of imaging planes each having different dark current characteristics. The image processing step may calculate a dark current estimated to be generated in each of the plurality of imaging planes, independently for each imaging plane, and perform a dark current eliminating process on the basis of a dark current value calculated for each imaging plane.

In an embodiment of the image pickup apparatus of the present invention, the image pickup device may be manufactured by a divisional exposure process and composed of the plurality of imaging planes each corresponding to each exposure area unit. The image processing step may calculate independently for each imaging plane a dark current estimated to be generated in each of the plurality of imaging planes corresponding to each exposure area unit, and perform the dark current eliminating process on the basis of a dark current value calculated for each imaging plane.

In an embodiment of the image pickup apparatus of the present invention, the image pickup device may include an effective image area for acquiring photographed image data; an optical black (OPB) area having lines corresponding to respective lines constituting the effective image area, respectively in each of the plurality of imaging planes each having different dark current characteristics. The image processing step may calculate a dark current value of the effective image area in each imaging plane by using a dark current measured in the OPB area set to the same imaging plane as a reference value, and perform the dark current eliminating process for the effective image area of each imaging plane by using the calculation result.

In an embodiment of the image pickup apparatus of the present invention, the image processing apparatus may include a storage unit storing a dark current data table for recording data including difference data based upon dark current measurement values between the effective image area in upper and lower areas in each imaging plane having different dark current characteristics and the OPB area. The image processing step may perform the dark current eliminating process for the effective image area of each imaging plane, by referring to the data recorded in the dark current data table.

In an embodiment of the image pickup apparatus of the present invention, the dark current data table may be a table for recording a plurality of data sets based on measurement values obtained under a plurality of photographing conditions changing at least either a shutter speed or a temperature. The image processing step may select a data set having conditions approximate to conditions during photographing from a plurality of data sets recorded in the dark current data table, on the basis of shutter speed or temperature information during photographing, and perform the dark current eliminating process for the effective image area in each imaging plane by referring to the selected data set.

In an embodiment of the image pickup apparatus of the present invention, the image pickup device may be composed of CMOS. The image processing step may read signals from the image pickup device composed of CMOS line-sequentially from an upper line to a lower line, on an assumption that a dark current contained in a read signal increases in proportion to transfer from an upper area to a lower area of the image pickup device, calculates a dark current value of the effective image area in each imaging plane, by using a dark current measured in the OPB area set to the same imaging plane as a reference value, and perform the dark current eliminating process for the effective image area in each imaging plane by using a calculation result.

In an embodiment of the image pickup apparatus of the present invention, the image processing unit may read signals from the image pickup device composed of CMOS line-sequentially from an upper line to a lower line, calculates a dark current contained in signals corresponding to each line of the effective image area from which the signals are read, by using a dark current value of the OPB area at the same line or a line one line before as a reference value, and perform the dark current eliminating process for the effective image area in each imaging plane by using a calculation result.

In an embodiment of the image pickup apparatus of the present invention, the image processing step may acquire a dark current value of the OPB area at each line by utilizing a measurement result by an integrator adopting an infinite impulse response (IIR) filter.

In an embodiment of the image pickup apparatus of the present invention, the image pickup device may include: an effective image area for acquiring photographed image data, formed in each of the plurality of imaging planes each having different dark current characteristics; an H-optical black (HOPB) area having lines corresponding to respective lines constituting the effective image area, at least in a same imaging plane as each of the plurality of imaging planes; and a V-optical black (VOPB) area set to an area containing each of the plurality of imaging planes. The image processing step may divide the VOPB area into areas corresponding to each of the plurality of imaging planes, measured a dark current of each divided VOPB area, and by adopting dark current values corresponding to the plurality of VOPB areas corresponding to the plurality of imaging planes and a dark current value measured in the at least one HOPB area, performs the dark current a dark current eliminating process for the effective image area of each imaging plane.

In an embodiment of the image pickup apparatus of the present invention, the image processing apparatus may include a storage unit storing a dark current data table for recording data including difference data based upon dark current measurement values between the effective image area in upper and lower areas in each imaging plane having different dark current characteristics and the HOPB area. The image processing step may perform the dark current eliminating process for the effective image area of each imaging plane, by referring to the data recorded in the dark current data table.

In an embodiment of the image pickup apparatus of the present invention, the dark current data table may be a table for recording a plurality of data sets based on measurement values obtained under a plurality of photographing conditions changing at least either a shutter speed of a temperature. The image processing step may select a data set having conditions approximate to conditions during photographing from a plurality of data sets recorded in the dark current data table, on the basis of shutter speed or temperature information during photographing, and perform the dark current eliminating process for the effective image area in each imaging plane by referring to the selected data set.

In an embodiment of the image pickup apparatus of the present invention, the image pickup device may be composed of CMOS. The image processing step may read signals from the image pickup device composed of CMOS line-sequentially from an upper line to a lower line, on an assumption that a dark current contained in a read signal increases in proportion to transfer from an upper area to a lower area of the image pickup device, calculate a dark current value of the effective image area in each imaging plane, by using a dark current measured in the HOPB area set to the same imaging plane as a reference value, and perform the dark current eliminating process for the effective image area in each imaging plane by using a calculation result.

In an embodiment of the image pickup apparatus of the present invention, the image processing step may read signals from the image pickup device composed of CMOS line-sequentially from an upper line to a lower line, calculate a dark current contained in signals corresponding to each line of the effective image area from which the signals are read, by using a dark current value of the HOPB area at the same line or a line one line before as a reference value, and perform the dark current eliminating process for the effective image area in each imaging plane by using a calculation result.

In an embodiment of the image pickup apparatus of the present invention, the image processing step may acquire a dark current value of the OPB area at each line by utilizing a measurement result by an integrator adopting an infinite impulse response (IIR) filter.

In accordance with a third aspect of the present invention, there is provided a computer program for making an image processing apparatus execute a process, including an image processing step of performing an image generating process by inputting a signal acquired by an image pickup device including a plurality of imaging planes each having different dark current characteristics, to an image processing unit. The image processing step may calculate a dark current estimated to be generated in each of the plurality of imaging planes, independently for each imaging plane, and perform a dark current eliminating process on the basis of a dark current value calculated for each imaging plane.

The computer program of an embodiment of the present invention is, for example, a computer program capable of providing a general computer executable various program code with a storage medium or a communication medium in a computer readable form. By providing this program in the computer readable form, processes corresponding to the program are implemented on a computer system.

The other objects, features and advantages of the present invention will become apparent from embodiments of the present invention to be described later and from the detailed description when read in conjunction with the accompanying drawings. A term "system" in this specification is intended to mean a logical set of a plurality of apparatus, and is not limited to apparatus of respective structures accommodated in the same housing.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 4 is a diagram explaining an example of the data structure of a dark current data table stored in a storage unit of the image pickup apparatus according to a first embodiment of the present invention.

FIG. 5 is a diagram explaining the details of the dark current eliminating process to be performed by the image pickup apparatus according to a first embodiment of the present invention.

FIG. 6 is a diagram explaining an example of the structure of an image pickup device mounted on an image pickup apparatus according to a second embodiment of the present invention.

FIG. 7 is a diagram explaining an example of setting an area whose dark current is measured in advance in a dark current eliminating process of the image pickup apparatus according to a second embodiment of the present invention.

FIG. 8 is a diagram explaining an example of the data structure of a dark current data table stored in a storage unit of the image pickup apparatus according to a second embodiment of the present invention.

FIG. 9 is a diagram explaining the processes to be executed in the dark current eliminating process to be executed by the image pickup apparatus according to a second embodiment of the present invention.

FIG. 10 is a diagram explaining areas from which dark currents are measured in the dark current eliminating process to be executed by the image pickup apparatus of a second embodiment of the present invention.

FIG. 12 is a diagram illustrating the details of the dark current eliminating process to the performed by the image pickup apparatus of a second embodiment of the present invention.

DETAILED DESCRIPTION OF EMBODIMENTS

Figure 1:
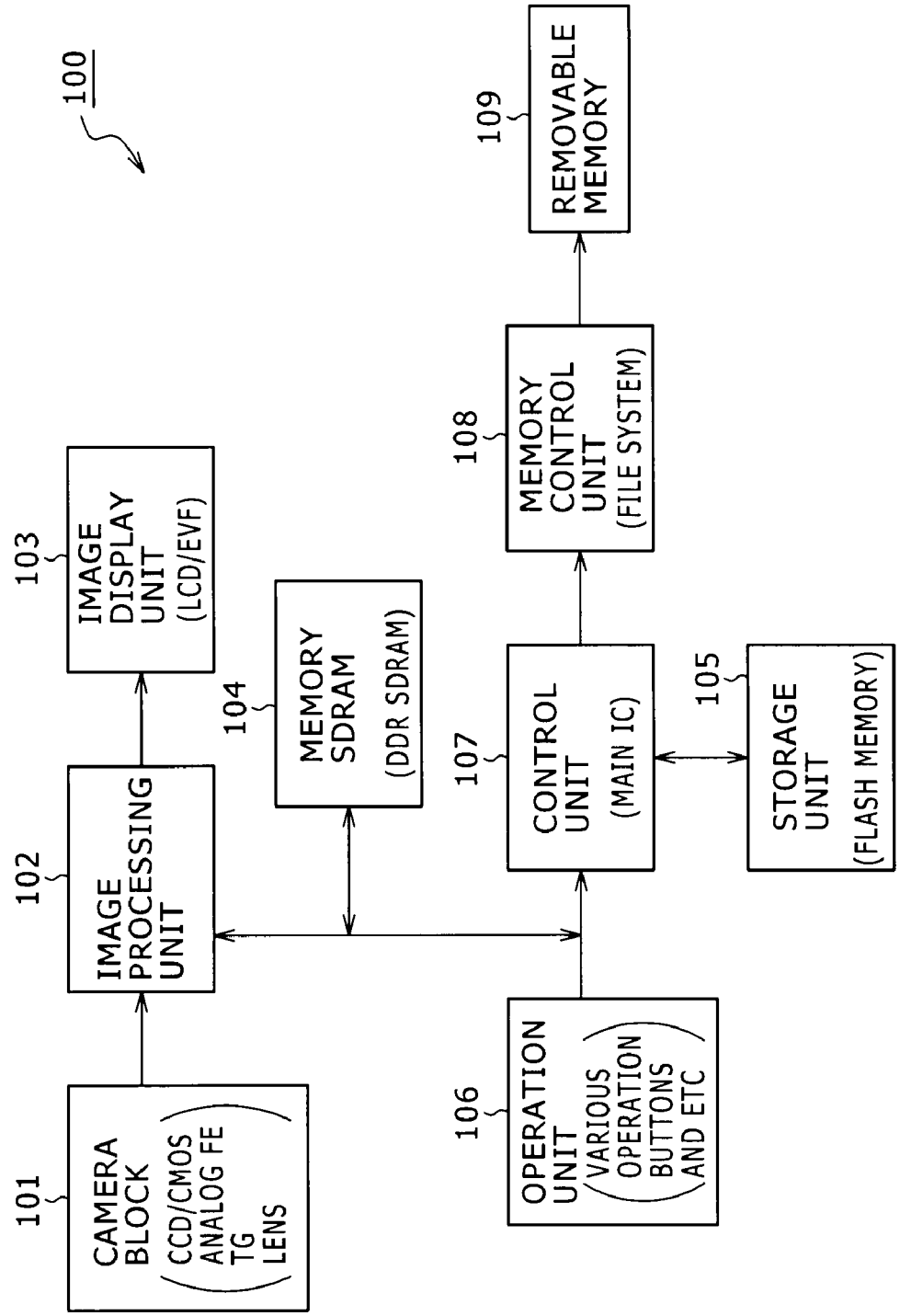
FIG. 1 is a diagram illustrating the structure of an image pickup apparatus and the outline of processes according to a first embodiment of the present invention.

With reference to the accompanying drawings, description will be made on the details of an image pickup apparatus, an image processing method and a computer program of embodiments of the present invention.

First, with reference to FIG. 1, description will be made of an embodiment of the structure of a digital still camera (DSC) which is an example of an image pickup apparatus of the present invention. An image pickup apparatus (digital still camera) 100 shown in FIG. 1 has: a camera block 101; an image processing unit 102; an image display unit 103 composed of a liquid crystal display (LCD), an electronic view finder (EVF) or the like; a memory 104 composed of SDRAM (DDR SDRAM) or the like used as a data buffer or the like; a storage unit 105 composed of, e.g., a flash memory or the like used as a storage area for programs, parameters and the like; an operation unit 106 composed of various buttons and the like such as a shutter and a mode setting part; a control unit (Main IC) 107 including a CPU as a program executing unit; a memory control unit 108 for performing data recording/reproducing control in accordance with a file system; and a removal memory 109.

The camera block 101 is composed of an image pickup device such as complementary metal oxide semiconductor (CMOS) or charge coupled device (CCD) a timing generator (TG) for driving the image pickup device, an analog front end (AFE) for converting electric charges captured by the image pickup device into electrical signals, a lens, a lens driver for driving the lens or the like.

The image pickup device composed of CMOS or CCD provided in the camera block 101 of the image pickup apparatus 100 of an embodiment of the present invention is a large image pickup device having pixels, e.g., not less than 10 million pixels. Specifically, the image pickup device is an image pickup device such as a large CMOS or CCD having the same size as that of a 35 mm film (36×24 mm).

The operation information is inputted to the control unit 107 when the shutter in the operation unit 106 is operated for photographing. Under the control by the control unit in accordance with the program stored in advance in the storage unit 105, a signal inputted from the camera block 101 is processed in the image processing unit 102, and recorded in the removable memory 109 in the format in conformity with a predetermined file system, under the control by the memory control unit 108. The signal obtained from the camera block 101 is subjected to processes such as interpolation processing and pixel mixture in the image processing unit 102, and converted into image signals such as YCbCr to form an image for a record file. Data such as programs or parameters necessary for these image processing is basically recorded in the storage unit 105 composed of a flash memory or the like. For image processing by the image processing unit 102, the memory (SDRAM) 104 is used as a buffer when necessary.

Even in a state that the shutter is not operated, a signal inputted from the camera block 101 is processed in the image processing unit 102, and a processed image is displayed on the display unit 103 composed of LCD, EVF or the like.

The image pickup device composed of CMOS or CCD in the camera block 101 of the image pickup apparatus 100 of an embodiment of the present invention is a large image pickup device such as CMOS or CCD having the same size as a 35 mm film (36×24 mm), for example, as described earlier. In manufacturing the large image pickup device, as described earlier, the image pickup device is divided into a plurality of areas, an exposure process is performed in the unit of each divisional area, and an integrated circuit of the whole image pickup device is completed by a plurality of exposure processes.

Namely, it is difficult to form the integrated circuit of the whole image pickup device by one exposure process because of limitation of a semiconductor manufacture apparatus, so-called stepper, so that manufacture processes are performed by dividing the area of the image pickup device. Specifically, it is difficult to form a semiconductor layer, an on-chip color filter layer, an on-chip micro lens layer and the like collectively for the whole image pickup device. Consequently, the exposure process is performed in the unit of a divisional area divided by two or three to form integrated circuits which are coupled to form one image pickup device. This image pickup device manufacture process is called stitching exposure.

In a solid state image pickup device manufactured by the stitching exposure, there are a sensitivity difference or a dark current difference between divisional areas each used as the exposure unit. Accordingly, areas having different image qualities are formed on a screen of a photographed image, unless signal processing considering each divisional area is performed, e.g., black level correction by a dark current eliminating process in the unit of each divisional area. If elimination of dark current noise in particular is incomplete, a lightness of a whole image increases, and there occurs a phenomenon called "black defect" that a black level of an image does not take 0. If "black defect" occurs in different area units of one image, the quality of a photograph is degraded considerably.

In the image processing unit 102 of the image pickup apparatus of an embodiment of the present invention, signals inputted from the image pickup device having different dark current generation amounts in divisional areas are processed according to the characteristics of each area to form an image of high quality. The processed image is stored in the removable memory 109 and displayed on the display unit 103. Each exposure area in a semiconductor manufacture process for CMOS or CCD is called a divisional area or an imaging plane. The image pickup apparatus of an embodiment of the present invention has the image pickup device including a plurality of imaging planes (divisional areas) having different characteristics. In processing input signals from the image pickup device including a plurality of imaging planes (divisional areas) having different characteristics, the image processing unit 102 performs a process considering the characteristics of each imaging plane (divisional area). Specifically, a dark current eliminating process is performed considering the characteristics of each imaging plane (divisional area), to generate a uniform and high quality image.

Description will now be made on a specific example of the dark current eliminating process to be performed by the image processing unit 102.

The image pickup device used in the image pickup apparatus relating to an embodiment of the present invention has a structure having, for example, not less than 10 million pixels disposed in an array form along horizontal lines and vertical columns. In the case of CMOS often used for a recent large imager, signals are read line-sequentially from an upper line of the image pickup device. For example, pixels in the uppermost line are read from left to right, then pixels in the second line are read from left to right, and eventually pixels to the lowermost line are read.

In the arrangement of this signal reading, there is a dark current noise amount difference between upper and lower areas of an image. Namely, a generation amount of dark current with a time lapse increases if the period of time until when a signal is read is prolonged, and a dark current in a lower image area becomes larger than that in an upper image area. This dark current tendency is estimated to be different in each imaging plane (divisional area). It is therefore preferable to perform the dark current eliminating process according to the characteristics of each imaging plane (divisional area).

As a known approach to the dark current eliminating process, for example, in one approach, after photographing, an all-black image is photographed by closing the shutter under the same condition (exposure time) as that of the photographed image, and data of the all-black image at corresponding pixels is subtracted from image data previously photographed. It is known that this process can eliminate dark current noise from the photographed image. With this approach, however, a photographing time is a twofold, an amount of data to be stored in a memory increases, and it takes a very long time for memory access and image processing. For example, if continuous photographing is performed, there arises inconvenience that an interval between photographed images becomes long.

Bearing these points in mind, the image processing unit 102 of the image pickup apparatus 100 of an embodiment of the present invention does not use the all-black image, but performs signal processing according to the characteristics for each imaging plane (divisional area) from only the photographed image, to generate a balanced and high quality image. Specifically, an image is generated by a process of eliminating, in real time and at good precision, a black level difference between planes formed by stitching exposure and a dark current noise difference between upper and lower imaging planes of CMOS.

A plurality of embodiments of the present invention will now be described sequentially hereunder.

First Embodiment

Figure 2:
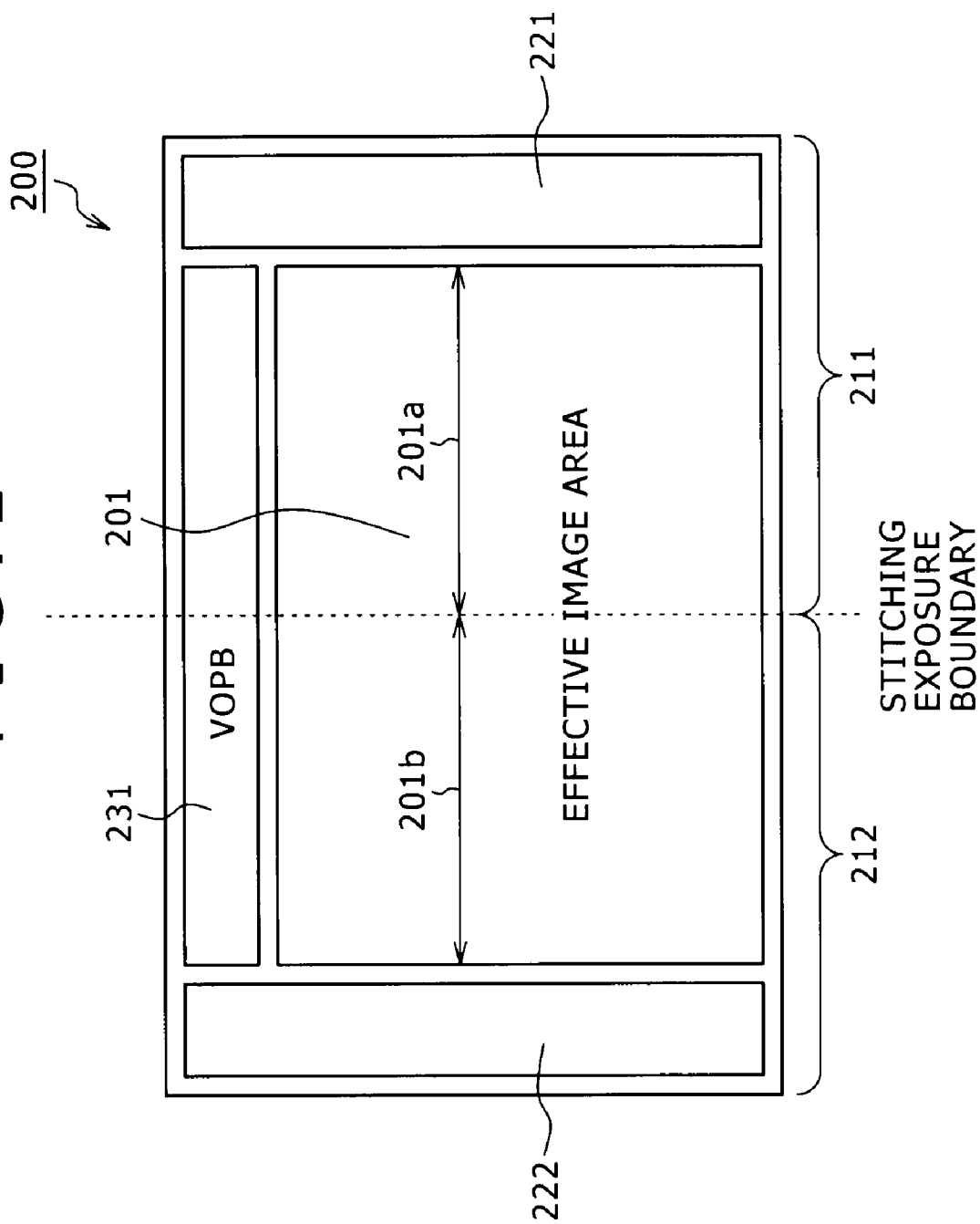
FIG. 2 is a diagram explaining an example of the structure of an image pickup device mounted on the image pickup apparatus according to a first embodiment of the present invention.

FIG. 2 shows a construction example of the image pickup device 200 used in the image pickup apparatus according to an embodiment of the present invention. The image pickup device 200 is manufactured by stitching exposure in which the formation of circuit is performed by a plurality of exposure processes at a manufacture stage. Therefore, the image pickup device has a plurality of imaging planes (divisional areas) having different characteristics. The image pickup device 200 shown in FIG. 2 is CMOS divided into two parts by stitching exposure. In the following, the right plane of the image pickup device 200 is called a first imaging plane 211 and the left plane is called a second imaging plane 212. Each imaging plane 211, 212 corresponds to a unit area of an exposure process at the manufacture stage, and has different characteristics.

The image pickup device 200 has an effective image area 201 for receiving incident light during a photographing process, and optical black (OPB) areas 221, 222, and 231 defined in peripheral areas of the effective image area 201 and substantially not receiving light during the photographing process. The OPB area above the effective image area 201 is called a VOPB area, the lateral OPB areas are called HOPB areas 221, 222. The HOPB area on the side of the first imaging plane 211 is called a first HOPB area 221, and the HOPB area on the side of the second imaging plane 212 is called a second HOPB area 222.

Pixels of the same size are disposed in an array in all of the effective image area 201, first HOPB area 221, second HOPB area 222 and VOPB area 231. A photographed image is generated on the basis of signals corresponding to pixels contained in the effective image area 200. The image pickup device 200 shown in FIG. 2 is CMOS, and signal reading is line-sequentially performed starting from an upper line (row).

In the dark current eliminating process of the image pickup device of this embodiment, dark current data of the first HOPB area 221 is adopted for eliminating dark current of the first imaging plane 211, and dark current data of the second HOPB area 222 is adopted for eliminating dark current of the second imaging plane 212. This is because a difference of the characteristics between left and right devices, i.e., between the first imaging plane 211 and second imaging plane 212 is taken into consideration.

Specifically, since storage characteristics of dark current are different between the first imaging plane 211 and second imaging plane 212, used for dark current elimination of an effective image area 201a contained in the first imaging plane 211 is dark current data of the first HOPB area 221 contained in the same first imaging plane 211, and used for dark current elimination of an effective image area 201b contained in the first imaging plane 212 is dark current data of the second HOPB area 222 contained in the same second imaging plane 212.

Regarding a dark current generated in the image plane, since signals are read line-sequentially from an upper line (row) of the image pickup device of CMOS as described earlier, a dark current noise amount generated in the imaging plane has a difference between the upper and lower areas of an image. Further, there is a difference between dark current amounts to be caused by an exposure time corresponding to a shutter speed and a temperature.

In the image pickup device of an embodiment of the present invention, a value of a dark current estimated to be generated according to a position of a line (row) of the imaging plane, an exposure time corresponding to a shutter speed, or a temperature is calculated beforehand for each of the first imaging plane 211 and second imaging plane 212, and a value of each calculated dark current is stored in a storage unit, e.g., the storage unit 105 shown in FIG. 1 as a data table (dark current data table).

Figure 3:
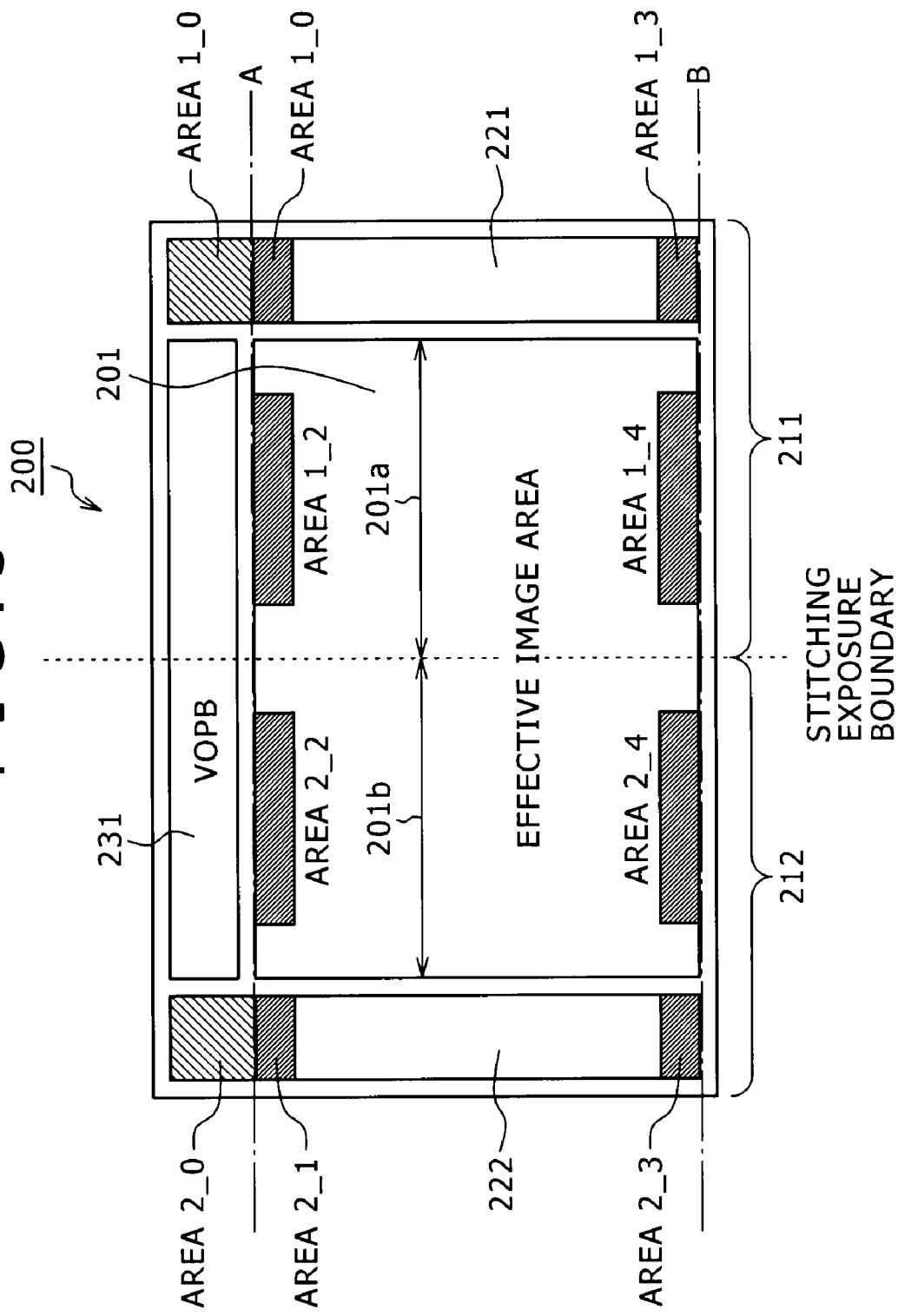
FIG. 3 is a diagram explaining an example of setting an area whose dark current is measured in advance in a dark current eliminating process of the image pickup apparatus according to a first embodiment of the present invention.

With reference to FIG. 3, description will be made on a process of forming the dark current data table. FIG. 3 shows an example of setting areas for which dark current data is measured in the dark current data table forming process. A dark current data acquiring process is a process of performing photographing without incidence light by changing a shutter speed or a temperature during a manufacture process for the image pickup apparatus, and measuring a dark current in each photographing state.

FIG. 3 is a diagram showing areas acquired for which is dark current data necessary for the dark current data table forming process. Areas 1_0 to 1_4 and areas 2_0 to 2_4 are set as dark current acquiring areas. Namely, the following areas are set as the dark current acquiring areas:

area 1_0: area from top row to the last row of VOPB in first HOPB area 1_1: area of several rows from same row as start row of effective image area in first HOPB area 1_2: area of several rows from start row of effective image area in effective image area in first imaging plane area 1_3: area of several rows to same row as end row of effective image area in effective image area in first HOPB area 1_4: area of several rows to same row as end row of effective image area in effective image area in first imaging plane area 2_0: area from top row to the last row of VOPB in second HOPB area 2_1: area of several rows from same row as start row of effective image area in second HOPB area 2_2: area of several rows from start row of effective image area in effective image area in second imaging plane area 2_3: area of several rows to same row as end row of effective image area in effective image area in second HOPB area 2_4: area of several rows to same row as end row of effective image area in effective image area in second imaging plane These areas 1_0 to 1_4 and areas 2_0 to 2_4 shown in FIG. 3 are set as dark current acquiring areas, photographing is performed without incidence light is performed under a plurality of conditions changing a shutter speed, a sensor temperature and the like, and then a value of a dark current generated in each area is measured.

A dark current generated in each area can be measured, for example, with an integrator adopting an infinite impulse response (IIR) filter. A value of a dark current generated in each area during photographing under various conditions adopting the IIR filter is calculated as "IIR integration result".

Namely, photographing is performed under various conditions changing a shutter speed or a temperature, to measure the "IIR integration result" generated in each of the areas 1_0 to 1_4 and areas 2_0 to 2_4 shown in FIG. 3, as a dark current amount corresponding to each area. Further, the following data α0, α1, β0, β1, a1, and b0 are calculated from the IIR integration results of the areas, and the dark current data table for recording the calculated data is stored in the storage unit.

The following data α0, α1, β0, β1, a1, and b0 are calculated by representing a dark current amount as the IIR integration result measured for each area p_q by IIR (area p_q).

$$\alpha 0 = \text{IIR}(\text{area } 1\_1) - \text{IIR}(\text{area } 1\_2)$$

$$\alpha 1 = \text{IIR}(\text{area } 1\_3) - \text{IIR}(\text{area } 1\_4)$$

$$\beta 0 = \text{IIR}(\text{area } 2\_1) - \text{IIR}(\text{area } 2\_2)$$

$$\beta 1 = \text{IIR}(\text{area } 2\_3) - \text{IIR}(\text{area } 2\_4)$$

$$a0 = \text{IIR}(\text{area } 1\_0)$$

$$b0 = \text{IIR}(\text{area } 2\_0)$$

The data α0, α1, β0, β1, a1, and b0 are calculated, and the dark current data table for recording the calculated data is stored in the storage unit. An example of the data configuration of the dark current data table is shown in FIG. 4.

The dark current data table shown in FIG. 4 records the calculated results of the data α0, α1, β0, β1, a1, and b0 by performing photographing under different conditions of 3×7=21 conditions including three different conditions of a temperature (T):

T=0 to 20° C.
T=20 to 40° C.
T=40 to 60° C.

and seven different shutter speeds:

Shutter speed=1/8000 to 1/100 seconds
Shutter speed=1/100 to 1 seconds
Shutter speed=1 to 4 seconds
Shutter speed=4 to 8 seconds
Shutter speed=8 to 16 seconds
Shutter speed=16 to 24 seconds
Shutter speed=24 to 30 seconds For example, the data set at the uppermost left recorded in the table is:

$$\alpha 0 = \text{IIR}(\text{area } 1\_1) - \text{IIR}(\text{area } 1\_2) = 50$$

$$\alpha 1 = \text{IIR}(\text{area } 1\_3) - \text{IIR}(\text{area } 1\_4) = 80$$

$$\beta 0 = \text{IIR}(\text{area } 2\_1) - \text{IIR}(\text{area } 2\_2) = 20$$

$$\beta 1 = \text{IIR}(\text{area } 2\_3) - \text{IIR}(\text{area } 2\_4) = 40$$

$$a0 = \text{IIR}(\text{area } 1\_0) = 170$$

$$b0 = \text{IIR}(\text{area } 2\_0) = 150$$

This data set is obtained at a shutter speed of 1/8000 to 1/100 seconds and a temperature of T=0 to 20° C. by performing photographing without incidence light, and calculating the IIR integration results "IIR(are p_q) corresponding to the total sum of a dark current amount of each of the areas 1_0 to 1_4 and areas 2_0 to 2_4 described with reference to FIG. 3.

The dark current data table shown in FIG. 4 records calculation results of the data $\alpha 0$, $\alpha 1$, $\beta 0$, $\beta 1$, a1, and b0 obtained by performing photographing under 3×7=21 different conditions including the above-described data set. A basic tendency is that a dark current amount increases as the shutter speed becomes slow and as the temperature rises.

In the dark current eliminating process for an actually photographed image, a data set matching the photographing condition is selected from the dark current data table, and image processing is performed by adopting the data $\alpha 0$, $\alpha 1$, $\beta 0$, $\beta 1$, a1, and b0 contained in the selected data set.

As described earlier, as a known approach to the dark current eliminating process, in one approach, after photographing, an all-black image is photographed by closing the shutter under the same condition (exposure time) as that of the photographed image, and data of the all-black image at corresponding pixels is subtracted from image data previously photographed, to eliminate a dark current. In performing this process, it is necessary to store dark current amounts (data of all-black image) corresponding to all pixels of the photographed image once in a memory. If a large image pickup device having, e.g., not less than 10 million pixels is utilized, a memory having a very large storage capacity is required.

In contrast, with the configuration of an embodiment of the present invention, it is sufficient if only six pieces of the data $\alpha 0$, $\alpha 1$, $\beta 0$, $\beta 1$, a1, and b0 are recorded in the table for one photographing condition as shown in FIG. 4. Even if a plurality of data sets corresponding to different photographing conditions are stored, the storage data capacity may be reduced considerably as compared to storing data corresponding to 10 million pixels.

Since data to be stored in the storage unit is only six data sets $\alpha 0$, $\alpha 1$, $\beta 0$, $\beta 1$, a1, and b0 for each condition, a capacity of the memory can be reduced considerably as compared to storing data corresponding to 10 million pixels.

Next, with reference to FIG. 5, description will be made on a specific example of the dark current eliminating process utilizing the dark current data table shown in FIG. 4. The dark current eliminating process is performed by the image processing unit of the image pickup apparatus shown in FIG. 1.

In the graph (1) shown in FIG. 5, the ordinate represents a dark current amount generated in the image pickup device, and the abscissa represents a position of an upper line to a lower line of the image pickup device. Each of four lines corresponds to each position in the image pickup device (2) shown in FIG. 5. Namely, the four lines in the graph (1) shown in FIG. 5 show dark current amounts starting from the uppermost line:

(P) dark current amount from upper to lower in first HOPB of first imaging plane (Q) dark current amount from upper to lower ineffective image area of first imaging plane (S) dark current amount from upper to lower in second HOPB of second imaging plane (R) dark current amount from upper to lower in effective image area of second imaging plane Although the dark current amounts in the VOPB areas of (Q) and (R) are not shown in FIG. 5, these lines are superposed upon the lines (P) and (S), respectively.

Straight lines rising to the upper right in the graph are ascribed, as described earlier, to that in CMOS, signals are read line-sequentially from an upper line (row) of the image pickup device, and a dark current amount increases more in the upper area of the image than in the lower area. The abscissa (Vq) of the graph corresponds to the position from the upper line to the lower line, and to a lapse time of a signal reading process.

The dark current amount changes also with an exposure time corresponding to a shutter speed or a temperature. Dark current amounts shown in the graph (1) are data examples at one shutter speed or one temperature. Slope of these lines changes also with an exposure time corresponding to a shutter speed or a temperature, and straight lines rise to the upper right like those shown in the graph (1) of FIG. 5.

It is known that the dark current amount becomes smaller than that in the OPB area since the dark current amount in the effective image area is suppressed by hydrogen annealing or the like. It is also considered that a dark current increases in proportion to time and increases linearly in the vertical direction of the image pickup device. Further, each device plane formed by stitching exposure has a different dark current noise amount even at the same time and temperature. Namely, the lines (P) and (Q) in the graph (1) shown in FIG. 5 show data of the HOPB and effective image areas of the first imaging plane, and the lines (S) and (R) show data of the HOPB and effective image areas of the first imaging plane. If the characteristics (dark current characteristics) of the first and second imaging planes are quite the same, the lines (P) and (S) and lines (Q) and (R) are superposed upon each other.

In CMOS, signals acquired by the image pickup unit of the camera block 101 shown in FIG. 1 are read sequentially from the upper line in a horizontal direction, by sequentially shifting to the lower line. Therefore, a time until signals are read prolongs more at the lower line, and a dark current amount becomes large in proportion to a lapse time. An increase in the dark current amount with the lapse time appears as a slope of each line in the graph. Of the data (P) and (Q) of the HOPB and effective image area of the first imaging plane, the dark current amount (Q) in the effective image area is smaller than the dark current amount (P) in the HOPB area. Similarly, of the data (S) and (R) of the HOPB and effective image area of the second imaging plane, the dark current amount (R) in the effective image area is smaller than the dark current amount (S) in the HOPB area. As described earlier, this is because the dark current amount of the effective image area is suppressed by hydrogen annealing or the like and the dark current amount becomes smaller than that in the OPB area.

$\alpha 0$, $\alpha 1$, $\beta 0$, and $\beta 1$ shown in the graph (1) of FIG. 5 indicating the dark current amounts indicate the data corresponding to the data recorded in the dark current data table described with reference to FIG. 4. Namely the dark current amounts correspond to the following data:

$\alpha 0 = \text{IIR}(\text{area } 1\_1) - \text{IIR}(\text{area } 1\_2)$ $\alpha 1 = \text{IIR}(\text{area } 1\_3) - \text{IIR}(\text{area } 1\_4)$ $\beta 0 = \text{IIR}(\text{area } 2\_1) - \text{IIR}(\text{area } 2\_2)$ $\beta 1 = \text{IIR}(\text{area } 2\_3) - \text{IIR}(\text{area } 2\_4)$ In the graph (1) shown in FIG. 5 indicating the dark current amounts, dark current data (P) of the first HOPB area in the first imaging plane and dark current data (S) of the second HOPB area in the second imaging plane is obtained through analysis of the photographed image. Namely, since there is no incidence light in the HOPB area, a dark current amount of each HOPB area can be obtained as the IIR integration result obtained by an integration process using the IIR filter. In the graph (1) shown in FIG. 5, the dark current data (Q) of the effective image area in the first imaging plane and the dark current data (R) is not obtained directly from the photographed image. Namely, light corresponding to photographed data is incident upon the effective image area, and current flows in accordance with the incidence light. As a result, the dark current amount of the effective image area is not obtained directly.

In the image pickup apparatus of an embodiment of the present invention, in eliminating a dark current from the input signal from the camera block 101, the image processing unit 102 obtains the dark current data (P) in the first HOPB area and the dark current data (S) in the second HOPB area shown in the graph (1) shown in FIG. 5, calculates the dark current data (Q) of the effective image area in the first imaging plane by utilizing the dark current data (P) of the first HOPB area, and the dark current data (R) of the effective image area in the second imaging plane by utilizing the dark current data (S) of the second HOPB area. In this manner, a reference dark current amount of the HOPB area is obtained independently for each imaging plane having different characteristics, and by adopting each reference dark current amount, a dark current amount of the effective image area in each imaging plane is calculated.

Description will be made on a specific dark current eliminating process to be performed in the image processing unit 102. When signals of the image pickup device of the camera block 101 are inputted, the image processing unit 102 calculates the IIR integration result data corresponding to the total sum of dark currents of the area 1_0 described with reference to FIG. 3 and the total sum of dark currents of the area 2_0, the IIR integration result data being:

$a0 = \text{IIR}(\text{area } 1\_0)$ $b0 = \text{IIR}(\text{area } 2\_0)$ and further selects a parameter set of $\alpha 0$, $\alpha 1$, $\beta 0$, and $\beta 1$ to be used for correction from the photographing condition (shutter speed value or sensor temperature).

Namely, a data set having data coincident with or approximate to the following data:

a0 corresponding to total sum of dark current of area 1_0=IIR(area 1_0);

b0 corresponding to total sum of dark current of area 2_0=IIR(area 2_0);

shutter speed during photographing; and temperature condition during photographing is selected from a plurality of data sets in the dark current data table described with reference to FIG. 4.

The dark current data table records the following data which is measured in advance at various shutter speeds at a predetermined temperature condition:

$a0 = \text{IIR}(\text{area } 1\_0)$ $b0 = \text{IIR}(\text{area } 2\_0)$

If the shutter speed and temperature conditions during photographing are obtained, the values "a0" and "b0" in the data set selected on the basis of the shutter speed and temperature conditions are fundamentally approximately equal to the values "a0" and "b0" measured from the photographed image. Therefore, by using only the shutter speed and temperature conditions, the data set corresponding to these conditions may be selected from the data table shown in FIG. 4. Alternatively, the following values may be measured from the photographed image:

a0 corresponding to total sum of dark current of area 1_0=IIR(area 1_0)

b0 corresponding to total sum of dark current of area 2_0=IIR(area 2_0)

and the data set having values approximate to the measured values:

$a0 = \text{IIR}(\text{area } 1\_0)$ $b0 = \text{IIR}(\text{area } 2\_0)$ is selected from the data table.

Namely, the data set to be used may be selected by using all data (1) to (4) or using only data (1) and (2) or data (3) and (4) from the data table:

(1) a0 corresponding to total sum of dark current of area 1_0=IIR(area 1_0)

(2) b0 corresponding to total sum of dark current of area 2_0=IIR(area 2_0)

(3) shutter speed when photographing (4) temperature condition when photographing After the data set "$\alpha 0$, $\alpha 1$, $\beta 0$, and $\beta 1$" to be used is selected from the dark current data table, the image processing unit 102 performs the dark current eliminating process by using this data set. In the structure of the image pickup device (2) shown in FIG. 5, the uppermost line in effective area is represented by A, the lowermost line in effective area is represented by B, the number of pixels in vertical direction between A and B is represented by vqmax, the number of pixels in vertical direction from A to presently reading row is represented by vq and IIR integration results at a currently reading line during integration adopting an IIR filter, i.e., during IIR integration of each of the first and second HOPB areas from the top line, are represented by:

IIR1($vq$)

IIR2($vq$)

IIR1($vq$) and IIR2($vq$) correspond to IIR1($vq$) and IIR2($vq$) in the graph (1) shown in FIG. 5. Namely:

IIR1($vq$): dark current amount at currently reading row ($vq$) in first HOPB area IIR2($vq$): dark current amount at currently reading row ($vq$) in second HOPB area By using each value of IIR1($vq$), IIR2($vq$) and data "$\alpha 0$, $\alpha 1$, $\beta 0$, and $\beta 1$" acquired from the dark current data table, clamp values (a value to be subtracted from each pixel data, i.e., a dark current amount, to make black levels be coincident) clamp1($vq$) and clamp2($vq$) corresponding to the effective image areas in the first and second imaging planes can be calculated from the following formulas (1) and (2)

$$\begin{aligned} clamp1(vq) &= IIR1(vq-1) - \Delta 1(vq-1) \\ &= IIR1(vq-1) - ((\alpha 1 - \alpha 0) \times \\ &\quad (vq-1)/vqmax + \alpha 0) \end{aligned} \quad \text{formula (1)}$$

$$\begin{aligned} clamp2(vq) &= IIR2(vq) - \Delta 2(vq) \\ &= IIR1(vq) - ((\beta 1 - \beta 0) \times \\ &\quad (vq)/vqmax + \beta 0) \end{aligned} \quad \text{formula (2)}$$

In the formula (1),

IIR1($vq-1$): dark current amount of first HOPB area at a line ($vq-1$) one line before a currently reading line, and $\Delta 1(vq-1)$: difference between dark current amount IIR1 ($vq-1$) of first HOPB area at a line ($vq-1$) one line before a currently reading line and dark current amount at row ($vq-1$) of effective image area in first imaging plane. If data is acquired from upper left of the image pickup device, a process of reading data of the first HOPB area is performed after data of the effective image area at the same line is read. Accordingly, data IIR1($vq-1$) and $\Delta 1(vq-1)$ at the preceding line ($vq-1$) obtained as the preceding read data is used for the purposes of convenience. It is considered that a difference between IIR integration results of the HOPB area at adjacent lines is very small so that even if the IIR integration result at a line one line above is used, a large difference between processing results will not be generated.

Obviously, data at a current line ($vq$) may be acquired to use data IIR1($vq$) and $\Delta 1(vq)$.

As indicated by the formula (1), $\Delta 1(vq-1)$ may be replaced with $\Delta 1(vq-1)=(\alpha 1-\alpha 0)\times (vq-1)/vqmax+\alpha 0$. In this formula, $\alpha 1$ and $\alpha 0$ are values acquired from the dark current data table:

$\alpha 0$=IIR(area 1_1)−IIR(area 1_2)

$\alpha 1$=IIR(area 1_3)−IIR(area 1_4)

vqmax: the number of pixels (the number of lines) between the effective pixel areas A and B. As shown in FIG. 5, $\alpha 0$ and $\alpha 1$ are:

$\alpha 0$: difference between dark current amount IIR1(B) in first HOPB area on the first imaging plane side at the lowermost line (B) of effective image area and dark current amount at corresponding line (B) of effective image area, and $\alpha 1$: difference between dark current amount IIR1(A) in first HOPB area on the first imaging plane side at the uppermost line (A) of effective image area and dark current amount at corresponding line (A) of effective image area.

As understood from a correspondence among $\alpha 0$, $\alpha 1$, and $\Delta 1(vq-1)$ in the graph (2) shown in FIG. 5, $\Delta 1(vq-1)$ is expressed as follows.

$\Delta 1(vq-1)=(\alpha 1-\alpha 0)\times (vq-1)/vqmax+\alpha 0$

In place of $\Delta 1(vq-1)$, a difference value corresponding to an actual read line ($vq$) may be calculated by the above-described formula:

$\Delta 1(vq)=(\alpha 1-\alpha 0)\times (vq)/vqmax+\alpha 0$ to obtain:

clamp1($vq$)=IIR1($vq-1$)−$\Delta 1(vq)$=IIR1($vq-1$)−(($\alpha 1-$ $\alpha 0)\times (vq)/vqmax+\alpha 0$)

in order to perform a process of calculating a dark current value of the first imaging plane at a current line.

A clamp value corresponding to a dark current value of the effective image area in the second imaging plane at a current line ($vq$) is calculated from the following formula as described above:

clamp2($vq$)=IIR2($vq$)−$\Delta 2(vq)$=IIR1($vq$)−(($\beta 1-\beta 0)\times$ $(vq)/vqmax+\beta 0$)  formula (2)

A clamp value corresponding to a dark current value of the effective image area in the second imaging plane at a current line (vq) is calculated from the formula (2). In the calculation formula for the clamp value of the effective image area in the second imaging plane, IIR2($vq$): dark current amount of second HOPB area at a currently reading line (vq), and $\Delta 1(vq)$: difference between dark current amount of second HOPB area at a currently reading line (vq) and dark current amount at row (vq) of effective image area in second imaging plane.

Signals are read from left to right, and in the second imaging plane, data in the second HOPB area is read first so that IIR2($vq$) can be calculated before without a necessity of reading data at the preceding line. Obviously, even if data at a preceding line is read by considering a processing speed, there is no large difference between processing results.

As indicated by the formula (2), $\Delta 2(vq)$ may be replaced with $\Delta 2(vq)=(\beta 1"\beta 0)\times (vq)/vqmax+\beta 0$. In this formula, $\beta 0$ and $\beta 1$ are values acquired from the dark current data table:

$\beta 0$=IIR(area 2_1)−IIR(area 2_2)

$\beta 1$=IIR(area 2_3)−IIR(area 2_4)

vqmax: the number of pixels (the number of lines) between the effective pixel areas A and B. As shown in FIG. 5, $\beta 0$ and $\beta 1$ are:

$\beta 0$: difference between dark current amount IIR2(B) in second HOPB area on the second imaging plane side at the lowermost line (B) of effective image area and dark current amount at corresponding line (B) of effective image area, and $\beta 1$: difference between dark current amount IIR2(A) in second HOPB area on the second imaging plane side at the uppermost line (A) of effective image area and dark current amount at corresponding line (A) of effective image area.

As understood from a correspondence among $\beta 0$, $\beta 1$, and $\Delta 2(vq)$ in the graph (2) shown in FIG. 5, $\Delta 2(vq)=(\beta 1-\beta 0)\times (vq)/vqmax+\beta 0$ With the processes described above, by using as a reference the first and second HOPB areas in the first and second imaging planes having different characteristics, a clamp value at an arbitrary line on a screen in the effective image area of each imaging plane, i.e., a dark current value to be subtracted, can be calculated as a value corresponding to the characteristics of each imaging plane.

The image processing unit 102 subtracts a dark current value (clamp value) obtained independently for each imaging plane from image data at each line. Thus, an image having a coincident black level (having corrected dark current noise components) is generated, and stored in the removal media 109, and outputted to the image display unit 103.

In the dark current eliminating process by the image processing unit 102, an integration value is calculated by adopting the IIR filter to calculate a dark current in each set area. In the IIR integration process in each area, a pixel having a current value level not satisfying a lower limit threshold value "Th$_{Low}$," or the pixel having a current value level in excess of an upper limit threshold value "Th$_{Hi}$" is considered as defective pixels, so that these pixels may be excluded from the integration process.

Further, in the above-described processes, integration using an IIR filter is described to calculate a dark current of each area. However, calculating a dark current is not limited only to integration using an IIR filter. For example, an average dark current value may be used by calculating an average of dark current values of each set area. If an average dark current value is used, instead of the IIR integration value "IIR1($vq$)" of the first HOP area described in the embodiment, a pixel average value of the first HOPB area at a line ($vq$) is used, and instead of the IIR integration value "IIR2($vq$)" of the second first HOPB area, a pixel average value of the second HOPB area at a line ($vq$) is used. Also, instead of the data α0, α1, β0, β1, a1, and b1 recorded in the dark current data table recorded in the storage unit, average values of data of corresponding areas are used.

Namely, the data α0, α1, β0, β1, a1, and b1 are calculated in the following manner by representing a pixel average value of an area (p_q) by ave (area p_q) and obtaining an average of pixel values of each of the areas 1_0 to 1_3 and areas 2_0 to 2_3:

$$\alpha 0 = \text{ave(area 1\_1)} - \text{ave(area 1\_2)}$$

$$\alpha 1 = \text{ave(area 1\_3)} - \text{ave(area 1\_4)}$$

$$\beta 0 = \text{ave(area 2\_1)} - \text{ave(area 2\_2)}$$

$$\beta 1 = \text{ave(area 2\_3)} - \text{ave(area 2\_4)}$$

$$a0 = \text{ave(area 1\_0)}$$

$$b0 = \text{ave(area 2\_0)}$$

These data are measured and calculated by changing the shutter speed and temperature and stored in the storage unit as the dark current data table. These data are selected in accordance with the photographing conditions, and a dark current in each imaging plane is calculated to perform the dark current eliminating process.

Second Embodiment

The above-described first embodiment requires the structure that the individual HOPB area is set in correspondence with each imaging plane having different characteristics and the HOPB area is set in correspondence with each imaging plane. However, in fabricating an actual image pickup device, there is a requirement for setting a small HOPB area in order to set a large effective image area. For example, there is a structure that one HOPB area is set for two imaging planes having different characteristics. Further, for example, if there are three or more imaging planes having different characteristics, it may be not preferable to set an HOPB area for each imaging plane because an area of the effective image areas becomes small. In the second embodiment, description will be made on the structure of an image pickup device having HOPB areas smaller in number than the number of imaging planes having different characteristics without setting the individual HOPB area corresponding to the imaging plane having different characteristics, and on an example of the dark current eliminating process for the image pickup device.

FIG. 6 shows an example of the structure of an image pickup device 300 of the second embodiment. Similar to the first embodiment, the image pickup device 300 was manufactured by stitching exposure forming circuits by a plurality of exposure processes at a manufacture stage. Consequently, the image pickup device has a plurality of imaging planes (divisional areas) having different characteristics. The image pickup device 300 shown in FIG. 6 is CMOS manufactured by two-dividing using stitching exposure, and has a right first imaging plane 311 and a left second imaging plane 312. The imaging planes 311 and 312 have different characteristics corresponding to exposure process unit areas during a manufacture stage.

The image pickup device 300 has an effective image area 301 for receiving incident light during a photographing process and storing signals for forming an image, and optical black (OPB) areas 321 and 331 defined in peripheral areas of the effective image area 301 and substantially not receiving light during the photographing process. The OPB area above the effective image area 301 is a VOPB area 331. In this embodiment, the OPB area at the side of the effective image area 301 is only a first HOPB area 321 on the side of a first imaging plane 311, and an HOPB area on the side of a second imaging plane 312 is not provided.

Pixels of the same size are disposed in an array in all of the effective image area 301, first HOPB area 321 and VOPB area 331. A photographed image is generated on the basis of signals corresponding pixels contained in the effective image area 301. The image pickup device 300 shown in FIG. 6 is CMOS, and signal reading is line-sequentially performed starting from an upper line (row).

In the dark current eliminating process of the image pickup apparatus of this embodiment, dark current data of the first HOPB area 321 and dark current data of the VOPB area 331 are adopted for eliminating dark current of the first and second imaging planes 311 and 312.

Similar to the above-described first embodiment, also in this embodiment, a value of a dark current estimated to be generated according to a position of a line (row) of the imaging plane, an exposure time corresponding to a shutter speed, and a temperature is calculated beforehand for each of the first and second imaging planes 311 and 312, and a value of each calculated dark current is stored in a storage unit, e.g., the storage unit 105 shown in FIG. 1 as a data table (dark current data table).

With reference to FIG. 7, description will be made on a process of forming the dark current data table. FIG. 7 shows an example of setting areas for which dark current data is measured in the dark current data table forming process. A dark current data acquiring process is performed by photographing without incidence light with changing a shutter speed and a temperature during a manufacture process for the image pickup apparatus, as measuring a dark current in each photographing state.

FIG. 7 is a diagram showing areas acquired for dark current data necessary for the dark current data table forming process. Areas 0 to 6 are set as dark current acquiring areas. Namely, the following areas are set as the dark current acquiring areas:

area 0: area from top row to start row of VOPB in first HOPB area 1: area of several rows from start row of effective image area in first HOPB area 2: area of several rows from end row of effective image area in effective image area in first HOPB area 3: area of several rows from start row of effective image area in effective image area in first imaging plane area 4: area of several rows to same row as end row of effective image area in effective image area in first imaging plane area 5: area of several rows to start row of effective image area in effective image area in second imaging plane area 6: area of several rows to same row as end row of effective image area in effective image area in second imaging plane These areas 0 to 6 shown in FIG. 7 are set as dark current acquiring areas, photographing without incidence light is performed under a plurality of conditions changing a shutter speed, a sensor temperature or the like, and a value of a dark current generated in each area is measured.

A dark current generated in each area may be measured, for example, with an integrator adopting an infinite impulse response (IIR) filter. A value of a dark current generated in each area during photographing under various conditions adopting the IIR filter is calculated as "IIR integration result".

Namely, under various conditions changing a shutter speed or a temperature, photographing is performed to measure the "IIR integration result" generated in each of the areas 0 to 6 shown in FIG. 7 as a dark current amount corresponding to each area. Further, the following data $\alpha 0, \alpha 1, \beta 0, \beta 1$, and a0 are calculated from the IIR integration results of the areas, and the dark current data table for recording the calculated data is stored in the storage unit.

The following data $\alpha 0, \alpha 1, \beta 0, \beta 1$, and a0 are calculated by representing a dark current amount as the IIR integration result measured for each area p_q by IIR(area p_q).

$\alpha 0 = \text{IIR(area 1)} - \text{IIR(area 3)}$ $\alpha 1 = \text{IIR(area 2)} - \text{IIR(area 4)}$ $\beta 0 = \text{IIR(area 1)} - \text{IIR(area 5)}$ $\beta 1 = \text{IIR(area 2)} - \text{IIR(area 6)}$ $a 0 = \text{IIR(area 0)}$ The data $\alpha 0, \alpha 1, \beta 0, \beta 1$, and a0 are calculated, and the dark current data table for recording the calculated data is stored in the storage unit. An example of the structure of the dark current data table is shown in FIG. 8.

The dark current data table shown in FIG. 8 records the calculated results of the data $\alpha 0, \alpha 1, \beta 0, \beta 1$, and a0 by performing photographing under different conditions of 3×7=21 conditions including three different conditions of a temperature (T):

T=0 to 20° C.
T=20 to 40° C.
T=40 to 60° C.

and seven different shutter speeds:

Shutter speed=1/8000 to 1/100 seconds
Shutter speed=1/100 to 1 seconds
Shutter speed=1 to 4 seconds
Shutter speed=4 to 8 seconds
Shutter speed=8 to 16 seconds
Shutter speed=16 to 24 seconds
Shutter speed=24 to 30 seconds For example, the data set at the uppermost left is:

$\alpha 0 = \text{IIR(area 1)} - \text{IIR(area 3)} = 50$ $\alpha 1 = \text{IIR(area 2)} - \text{IIR(area 4)} = 80$ $\beta 0 = \text{IIR(area 1)} - \text{IIR(area 5)} = 20$ $\beta 1 = \text{IIR(area 2)} - \text{IIR(area 6)} = 40$ $a 0 = \text{IIR(area 0)} = 170$ This data set is obtained at a shutter speed of 1/8000 to 1/100 seconds and a temperature of T=0 to 20° C. by performing photographing without incident light, and calculating the IIR integration results "IIR(are p_q) corresponding to the total sum of a dark current amount of each of the areas 0-6 described with reference to FIG. 7.

The dark current data table shown in FIG. 7 records calculation results of the data $\alpha 0, \alpha 1, \beta 0, \beta 1$, and a0 obtained by performing photographing under 3×7=21 different conditions including the above-described data set. A basic tendency is that a dark current amount increases as the shutter speed becomes slow and as the temperature rises.

In the dark current eliminating process for an actually photographed image, a data set matching the photographing condition is selected from the dark current data table, and image processing is executed by adopting the data $\alpha 0, \alpha 1, \beta 0, \beta 1$, and a0 contained in the selected data set.

Similar to the above-described first embodiment, it is sufficient if only five pieces of the data $\alpha 0, \alpha 1, \beta 0, \beta 1$ and a0 are recorded for one photographing condition. Therefore, a required memory capacity can be made very small as compared to storing data corresponding to pixels of an all-black image necessary for a process adopting the all-black image known as a known dark current eliminating process.

Next, with reference to FIG. 9, description will be made on a specific example of the dark current eliminating process utilizing the dark current data table shown in FIG. 8. The dark current eliminating process is performed in the image processing unit of the image pickup apparatus shown in FIG. 1.

In the graph (1) shown in FIG. 9, the ordinate represents a dark current amount generated in the image pickup device, and the abscissa represents a position from an upper line to a lower line of the image pickup device. Each of four lines corresponds to each position in the image pickup device (2) shown in FIG. 9. Namely, the four lines in the graph (1) shown in FIG. 9 show dark current amounts starting from the uppermost line:

(P) dark current amount from upper to lower in first HOPB of first imaging plane (Q) dark current amount from upper to lower in effective image area of first imaging plane (S) dark current amount from upper to lower in second HOPB of second imaging plane (R) dark current amount from upper to lower in effective image area of second imaging plane Although the dark current amount from the upper to lower of the second HOPB area does not exist, it is shown for the purposes of explanations. Also, although the dark current amounts in the VOPB areas of (Q) and (R) are not shown in FIG. 9, these lines are superposed upon the lines (P) and (S), respectively.

Straight lines rising to the upper right in the graph are ascribed, as described earlier, to that in CMOS, signals are read line-sequentially from an upper line (row) of the image pickup device, and a dark current amount increases more in the lower area than in the upper area of the image. The abscissa (Vq) of the graph corresponds to the position from the upper line to the lower line, and to a lapse time of a signal read process.

The dark current amount changes also with an exposure time corresponding to a shutter speed and a temperature. Dark current amounts shown in the graph (1) of FIG. 9 are data examples at one shutter speed and one temperature. Slope of these lines changes also with an exposure time corresponding to a shutter speed and a temperature, and straight lines rise to the upper right like those shown in the graph (1) of FIG. 9.

It is known that the dark current amount becomes smaller than that in the OPB area since the dark current amount in the effective image area is suppressed by hydrogen annealing or the like. It is also considered that a dark current increases linearly in the vertical direction of the image pickup device because the dark current increases in proportion to time. Further, each device plane formed by stitching exposure has a different dark current noise amount even at the same time and temperature. Namely, the lines (P) and (Q) in the graph (1) shown in FIG. 9 show data of the HOPB and effective image areas of the first imaging plane, and the line (R) shows data of the effective image area of the second imaging plane. If the characteristics (dark current characteristics) of the first and second imaging planes are the same, the lines (Q) and (R) are superposed upon each other.

In CMOS, signals acquired by the image pickup unit of the camera block 101 shown in FIG. 1 are read sequentially from the upper line in a horizontal direction, by sequentially shifting to the lower line. Consequently, a time until signals are read prolongs more at the lower line, and a dark current amount becomes large in proportion to a lapse time. An increase in the dark current amount with the lapse time appears as a slope of each line in the graph.

In the graph (1) shown in FIG. 9 indicating the dark current amounts, dark current data (P) of the first HOPB area in the first imaging plane and dark current data (Q) of the second HOPB area in the second imaging plane can be obtained through analysis of the photographed image. Namely, since there is no incident light in the HOPB area, a dark current amount of each HOPB area is obtained as the IIR integration result obtained by an integration process using the IIR filter. In the graph (1) shown in FIG. 9, the dark current data (Q) of the effective image area in the first imaging plane and the dark current data (R) is not obtained directly from the photographed image. Namely, light corresponding to photographed data is incident upon the effective image area, and current flows in correspondence with the incident light so that the dark current amount of the effective image area is not obtained directly. Moreover, in this embodiment, the dark current data (S) of the second HOPB area shown in the graph (1) does not exist.

In the embodiment, in eliminating a dark current from the input signal from the camera block 101 in the image processing unit 102, difference information between dark currents of the first and second imaging planes is initially obtained. More specifically, as shown in FIG. 10, the VOPB area of each imaging plane is set:

the VOPB area on the first imaging plane 311 side is represented by first VOPB 401, and the VOPB area on the second imaging plane 312 side is represented by second VOPB 402. A dark current value of each area is calculated by IIR integration. In each area, an IIR integration result from the VOPB start line to the effective image area start line (A) is calculated:

the IIR integration result corresponding to a dark current of the first VOPB 401 is represented b "Ivopb1", and the IIR integration result corresponding to a dark current of the second VOPB 402 is represented by "Ivopb2".

The first imaging plane 311 and second imaging plane 312 have different characteristics, and the above two IIR integration results have different values. The values of "Ivopb1" and "Ivopb2" correspond to the values of the dark current amounts of "Ivopb1 and "Ivopb2" at the start line of the effective image area in the graph (1) shown in FIG. 9.

Figure 11:
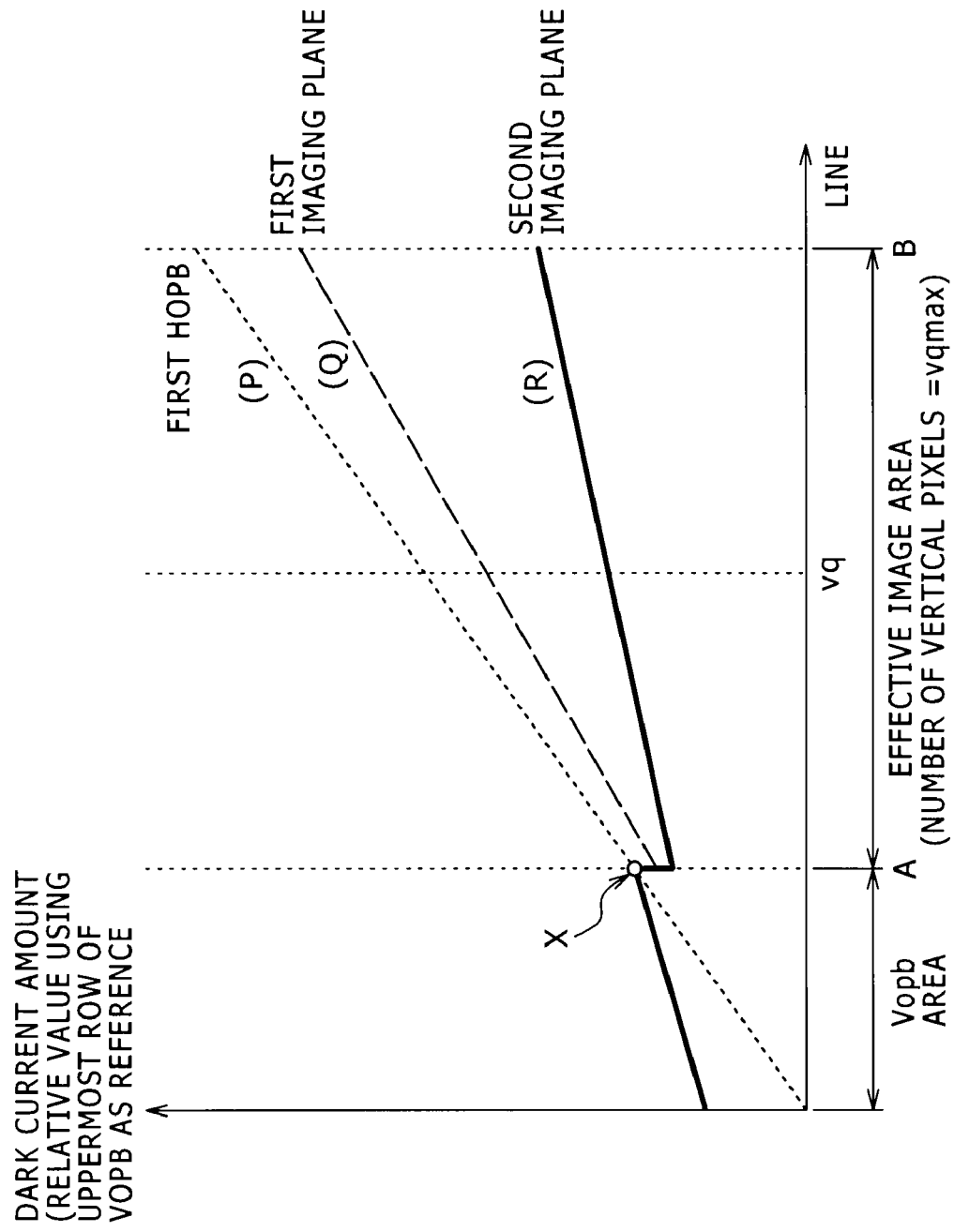
FIG. 11 is a diagram explaining processes to be performed in the dark current eliminating process to be performed by the image pickup apparatus of a second embodiment of the present invention.

Next, by using the IIR integration result "Ivopb1" corresponding to the dark current of the first VOPB 401 and the IIR integration result "Ivopb2" corresponding to the dark current of the second VOPB 402, a process is performed for virtually making the dark current amounts of the first imaging plane 311 and second imaging plane 312 be coincident with each other at the start line (A) of the effective image area 301. Namely, settings shown in FIG. 11 are made. For these settings, the following process is performed.

"Ivopb1" corresponding to the dark current of the first VOPB 401 on the first imaging 311 side is subtracted from the pixel value data of an effective image area 301a on the first imaging plane 311 side, and "Ivopb2" corresponding to the dark current of the second VOPB 402 on the second imaging plane 312 side is subtracted from the pixel value data of an effective image area 301b on the second imaging plane 312. With this subtraction process, the dark current amounts of the first imaging plane 311 and second imaging plane 312 are made virtually coincident with each other at the start line (A) of the effective image area 301, as indicated at a point "X" as shown in FIG. 11.

After this process, the image processing unit 102 performs the dark current eliminating process for each of the first imaging plane 311 and second imaging plane 312. This process will be described with reference to FIG. 12.

The data $\alpha 0$, $\alpha 1$, $\beta 0$, and $\beta 1$ shown in the graph of FIG. 12 indicating the dark current amounts is data corresponding to the data recorded in the dark current data table described with reference to FIGS. 7 and 8. Namely, the data is:

$\alpha 0$=IIR(area 1)−IIR(area 3)

$\alpha 1$=IIR(area 2)−IIR(area 4)

$\beta 0$=IIR(area 1)−IIR(area 5)

$\beta 1$=IIR(area 2)−IIR(area 6)

Description will be made on a specific dark current eliminating process in the image processing unit 102. When signals are inputted from the image pickup device provided in the camera block 101, the image processing unit 102 calculates the IIR integration result as the dark current value of the area 0 set above the first HOPB shown in FIG. 7, i.e., $a0$=IIR(area 0)

"a0" should have the same dark current value as "Ivopb1" corresponding to the dark current of the first VOPB 401 set at the same line of the same first imaging plane.

The image processing unit 102 calculates a0=IIR(area 0), and selects a parameter set ($\alpha 0$, $\alpha 1$, $\beta 0$, and $\beta 1$) to be used for correction from the conditions (shutter speed value and sensor temperature) during photographing.

Namely, a data set having data coincident with or approximate to the following data:

a0 corresponding to total sum of dark current of area 0=IIR (area 0)

shutter speed during photographing temperature condition during photographing is selected from a plurality of data sets in the dark current data table described with reference to FIG. 8.

The dark current data table records the following data which is measured in advance at various shutter speeds at a predetermined temperature condition:

$a0$=IIR(area 0)

If the shutter speed and temperature conditions during photographing are obtained, the value "a0" in the data set selected on the basis of the shutter speed and temperature conditions is fundamentally approximately equal to the value "a0" measured from the photographed image. Therefore, by using only the shutter speed and temperature conditions, the data set corresponding to these conditions may be selected from the data table shown in FIG. 4. Alternatively, the following value may be measured from the photographed image:

a0 corresponding to total sum of dark current of area 0=IIR (area 0)

and the data set having values approximate to the measured value:

$$a0 = IIR(\text{area } 0)$$

is selected from the data table.

Namely, the data set to be used may be selected by using all data (1) to (3) or using only data (1), data (2) or data (3) from the data table:

(1) a0 corresponding to total sum of dark current of area 0=IIR(area 0)

(2) shutter speed when photographing (3) temperature condition when photographing After the data set "α0, α1, β0, and β1" to be used is selected from the dark current data table, the image processing unit 102 performs the dark current eliminating process by using this data set. In the structure of the image pickup device (2) shown in FIG. 12, the uppermost line in effective area is represented by A, the lowermost line in effective area is represented by B, the number of pixels in vertical direction between A and B is represented by vqmax, the number of pixels in vertical direction from A to presently reading row is represented by vq and IIR integration results at a currently reading line is represented by IIR1 (vq).

The IIR1(vq) corresponds to IIR1(vq) in the graph (1) shown in FIG. 12. Namely:

IIR1(vq): dark current amount at currently reading row (vq) in first HOPB area By using each value of IIR1(vq) and data "α0, α1, β0, and β1" acquired from the dark current data table, clamp values (a value to be subtracted from each pixel data, i.e., a dark current amount, to make black levels be coincident) clamp1(vq) and clamp2(vq) corresponding to the effective image areas in the first and second imaging planes can be calculated from the following formulas (3) and (4):

$$\text{clamp1}(vq) = Ivopb1 + IIR(vq-1) - \Delta 1(vq-1) \quad \text{formula (3)}$$
$$= Ivopb1 + IIR(vq-1) - ((\alpha 1 - \alpha 0) \times (vq-1)/vq\text{max} + \alpha 0)$$

$$\text{clamp2}(vq-1) = Ivopb2 + IIR(vq) - \Delta 2(vq-1) \quad \text{formula (4)}$$
$$= Ivopb1 + IIR(vq-1) - ((\beta 1 - \beta 0) \times (vq-1)/vq\text{max} + \beta 0)$$

In the formula (3),

IIR(vq−1): dark current amount of first HOPB area at a line (vq−1) one line before a currently reading line, and α1(vq−1): difference between dark current amount IIR (vq−1) of first HOPB area at a line (vq−1) one line before a currently reading line and dark current amount at row (vq−1) of effective image area in first imaging plane. If data is acquired from upper left of the image pickup device, a process of reading data of the first HOPB area is performed after data of the effective image area at the same line is read. Therefore, data IIR(vq−1) and Δ1(vq−1) at the preceding line (vq−1) obtained as the preceding read data are used for the purposes of convenience. It is considered that a difference between IIR integration results of the HOPB area at adjacent lines is very small so that even if the IIR integration result at a line (vq−1) one line above is used, a large difference between processing results will not be generated.

In the formula (3), Δ1(vq−1) may be replaced with Δ1(vq−1)=(α1−α0)×(vq−1)/vqmax+α0). In this formula, α1 and α0 are values acquired from the dark current data table:

$$\alpha 0 = IIR(\text{area } 1) - IIR(\text{area } 3)$$

$$\alpha 1 = IIR(\text{area } 2) - IIR(\text{area } 4)$$

vqmax: the number of pixels (the number of lines) between the effective pixel areas A and B. As shown in the graph (1) of FIG. 12, α0 and α1 are:

α0: difference between dark current amount IIR(B) of first HOPB area on the first imaging plane side at the lowermost line (B) of effective image area and dark current amount at corresponding line (B) of effective image area, and α1: difference between dark current amount IIR(A) in first HOPB area on the first imaging plane side at the uppermost line (A) of effective image area and dark current amount at corresponding line (A) of effective image area.

As understood from a correspondence among α0, α1, and Δ1(vq−1) in the graph (1) shown in FIG. 12, Δ1(vq−1) are expressed as follows.

$$\Delta 1(vq-1) = (\alpha 1 - \alpha 0) \times (vq-1)/vq\text{max} + \alpha 0$$

In place of Δ1(vq−1), a difference value corresponding to an actual read line (vq) may be calculated by the above-described formula:

$$\Delta 1(vq) = (\alpha 1 - \alpha 0) \times (vq)/vq\text{max} + \alpha 0$$

to obtain:

$$\text{clamp1}(vq) = Ivopb1 + IIR1(vq) - \Delta 1(vq) = Ivopb1 + IIR1(vq) - ((\alpha 1 - \alpha 0) \times (vq)/vq\text{max} + \alpha 0)$$

in order to perform a process of calculating a dark current value of the first imaging plane at a current line.

A clamp value corresponding to a dark current value of the effective image area in the second imaging plane at a current line (vq) is calculated from the following formula as described above:

$$\text{clamp2}(vq) = Ovopb2 + IIR(vq-1) - \Delta 2(vq-1)) = Ivopb2 + IIR(vq-1) - ((\beta 1 - \beta 0) \times (vq-1))/vq\text{max} + \beta 0) \quad \text{formula (4)}$$

A clamp value corresponding to a dark current value of the effective image area in the second imaging plane at a current line (vq) can be calculated from the formula (4). In the formula (4) Δ2(vq−1) may be replaced with Δ2(vq−1)=(β1−β0)×(vq−1)/vqmax+β0). In this formula, β1 and β0 are values acquired from the dark current data table shown in FIG. 8:

$$\beta 0 = IIR(\text{area } 1) - IIR(\text{area } 5)$$

$$\beta 1 = IIR(\text{area } 2) - IIR(\text{area } 6)$$

vqmax: the number of pixels (the number of lines) between the effective pixel areas A and B. As shown in the graph (1) of FIG. 12, β0 and β1 are:

β0: difference between dark current amount IIR(B) in first HOPB area at the lowermost line (B) in effective image area and dark current amount at corresponding line (B) of effective image area, and β1: difference between dark current amount IIR(A) in first HOPB at the uppermost line (A) of effective image area and dark current amount at corresponding line (A) of effective image area.

As understood from a correspondence among β0, β1, and Δ2(vq−1) in the graph (1) shown in FIG. 12, Δ2(vq−1) is expressed as follows.

$$\Delta 2(vq-1) = (\beta 1 - \beta 0) \times (vq-1)/vq\max + \beta 0$$

With the processes described above, by adopting a dark current value of the first HOPB area formed in the first imaging plane and the dark current values in the VOPB areas formed in the first and second imaging planes, a clamp value at an arbitrary line on the screen of the effective image area of the first and second imaging planes, i.e., a dark current value to be subtracted, can be calculated as a value corresponding to the characteristics of each imaging plane.

The image processing unit 102 subtracts the dark current value (clamp value) obtained independently for each imaging plane from the image data at each line to generates an image (whose dark current noise components are corrected) with a coincident black level, store the generated image in the removable memory 109, and output the generated image to the display unit 103.

In the dark current eliminating process in the image processing unit 102, an integration value is calculated by adopting the IIR filter to calculate a dark current in each set area. In the IIR integration process in each area, a pixel having a current value level not satisfying a lower limit threshold value "$Th_{Low}$" or the pixel having a current value level in excess of an upper limit threshold value "$Th_{Hi}$" is considered as defective pixels so that these pixels may be excluded from the integration process.

Further, in the above-described processes, integration using an IIR filter is described to calculate a dark current of each area. However, calculating a dark current is not limited only to integration using an IIR filter. For example, an average dark current value may be used by calculating an average of dark current values of each set area, similar to the first embodiment described earlier.

The present invention has been described in detail with reference to particular embodiments. However, it is believed obvious that modifications and substitutions of the embodiments without departing from the gist of the present invention are possible. Namely, the present invention has been disclosed in the form of illustrative examples, and it should not be construed restrictively. In order to understand the gist of the present invention, the appended claims should be taken into consideration.

A series of processes described in the specification can be executed by hardware, software or both. If the processes are to be executed by software, a program recording a process sequence is installed in a memory of a computer assembled in dedicated hardware and executed, or installed in a memory of a general computer capable of executing various processes and executed. For example, the program may be recorded in a recording medium in advance. The program is installed in a computer from the recording medium, or is received via a network such as a local network (LAN) and the Internet and installed in a recording medium such as a built-in hard disc.

Various processes described in the specification are executed not only time sequentially in the order described but also parallel or separately according to a processing ability of an apparatus performing the processes or when necessary. A term "system" used in the specification is intended to mean a logical set of a plurality of apparatus, and is not limited to apparatus accommodated in the same housing.

As described so far, according to an embodiment configuration of the present invention, in the structure that a dark current is eliminated from a signal photographed with an image pickup device having a plurality of imaging planes each having different dark current characteristics in each exposure area unit because of divisional exposure in the manufacture process for a large image pickup device and the like, a dark current eliminating process is executed on the basis of a dark current value calculated for each imaging plane by calculating a dark current estimated to be generated in each of a plurality of imaging planes. Specifically, for examples the dark current eliminating process is performed by calculating a dark current estimated to be generated in each of the plurality of imaging planes, on the basis of data recorded in the dark current data table for recording data including difference data based on dark current measurement values between the OPB area and the effective image area in upper and lower areas in each imaging plane having different dark current characteristics. With this arrangement, a dark current corresponding to each imaging plane having different characteristics can be eliminated and high quality image data can be generated.

What is claimed is:

1. An image pickup apparatus comprising:
   an image pickup device including a plurality of imaging planes each having different dark current characteristics, each of the imaging planes having an effective image area, that acquires image data and has horizontal lines, and an optical black (OPB) area that has horizontal lines corresponding to the horizontal lines of the effective image area;
   a memory that stores a dark current data table including difference data between dark current values pre-measured at upper and lower areas of the effective image area of each of the imaging planes and dark current values pre-measured at corresponding upper and lower areas of the OPB area of each of the imaging planes; and
   an image processing unit to receive a signal from the image pickup device and performing an image generating process,
   wherein the image processing unit calculates estimate dark current values for the effective image area of each of the imaging planes based on the dark current data table stored in the memory and actual dark current values measured in the OPB area for each of the imaging planes, and performs a dark current eliminating process on the basis of the estimate dark current values.

2. The image pickup apparatus according to claim 1, wherein
   the image pickup device is manufactured by a divisional exposure process and includes the plurality of imaging planes each corresponding to each exposure area unit.

3. The image pickup apparatus according to claim 1, wherein:
   the dark current data table includes a plurality of data sets of the difference data, each of the data sets being pre-measured under a plurality of photographing conditions by changing at least either a shutter speed or a temperature; and
   the image processing unit selects a data set having photographing conditions approximate to actual photographing conditions during photographing from the plurality of data sets included in the dark current data table, the selection being made on the basis of actual shutter speed or actual temperature information during the photographing, and the dark current eliminating process for the effective image area of each of the imaging planes being performed by referring to the selected data set.

4. The image pickup apparatus according to claim 1, wherein:
   the image pickup device is a CMOS imager; and the image processing unit reads signals from the CMOS imager in a line-sequential manner from an upper horizontal line to a lower horizontal line and calculates the estimate dark current values for the horizontal lines of the effective image area of each of the imaging planes based on an assumption that a dark current value for a horizontal line proportionally increases as the horizontal line moves from a top to a bottom of the horizontal lines.

5. The image pickup apparatus according to claim 4, wherein the image processing unit calculates the estimate dark current value for each horizontal line of the effective image area based on the actual dark current value measured for a corresponding horizontal line or for a horizontal line ahead of the corresponding horizontal line in the OPB area as a reference value.

6. The image pickup apparatus according to claim 5, wherein the image processing unit measures the dark current value for each of the horizontal lines of the OPB area by utilizing a measurement result by an integrator adopting an infinite impulse response (IIR) filter.

7. An image processing method comprising:
receiving a signal acquired by an image pickup device including a plurality of imaging planes each having different dark current characteristics, each of the imaging planes having an effective image area, that acquires image data and has horizontal lines, and an optical black (OPB) area that has horizontal lines corresponding to the horizontal lines of the effective image area;
storing a dark current data table including difference data between dark current values pre-measured at upper and lower areas of the effective image area of each of the imaging planes and dark current values pre-measured at corresponding upper and lower areas of the OPB area of each of the imaging planes;
calculating estimate dark current values for the effective image area of each of the imaging planes based on the dark current data table stored in the storing and actual dark current values measured in the OPB area for each of the imaging planes; and
performing a dark current eliminating process on the basis of the estimate dark current values.

8. The image processing method according to claim 7, wherein
the image pickup device is manufactured by a divisional exposure process and includes the plurality of imaging planes each corresponding to each exposure area unit.

9. The image processing method according to claim 7, wherein:
the dark current data table includes a plurality of data sets of the different data, each of the data sets being pre-measured under a plurality of photographing conditions by changing at least either a shutter speed or a temperature; and
the calculating includes selecting a data set having photographing conditions approximate to actual photographing conditions during photographing from the plurality of data sets included in the dark current data table, the selecting being on the basis of actual shutter speed or actual temperature information during the photographing, and the dark current eliminating process for the effective image area of each of the imaging planes being performed by referring to the selected data set.

10. The image processing method according to claim 7, wherein:
the image pickup device is a CMOS imager; and
the receiving receives signals from the CMOS imager in a line-sequential manner from an upper horizontal line to a lower horizontal line, and the calculating calculates the estimate dark current values for the horizontal lines of the effective image area of each of the imaging planes based on an assumption that a dark current value for a horizontal line proportionally increases as the horizontal line moves from a top to a bottom of the horizontal lines.

11. The image processing method according to claim 10, wherein the calculating calculates the estimate dark current value for each horizontal line of the effective image area based on the actual dark current value measured for a corresponding horizontal line or for a horizontal line ahead of the corresponding horizontal line in the OPB area as a reference value.

12. The image processing method according to claim 11, wherein the dark current value for each of the horizontal lines of the OPB area is measured by utilizing a measurement result by an integrator adopting an infinite impulse response (IIR) filter.

13. A non-transitory computer-readable medium having instructions recorded thereon that when executed by a processor performs steps comprising:
receiving a signal acquired by an image pickup device including a plurality of imaging planes each having different dark current characteristics, each of the imaging planes having an effective image area, that acquires image data and has horizontal lines, and an optical black (OPB) area that has horizontal lines corresponding to the horizontal lines of the effective image area;
storing a dark current data table including difference data between dark current values pre-measured at upper and lower areas of the effective image area of each of the imaging planes and dark current values pre-measured at corresponding upper and lower areas of the OPB area of each of the imaging planes;
calculating estimate dark current values for the effective image area of each of the imaging planes, based on the dark current data table stored in the storing and actual dark current values measured in the OPB area for each of the imaging planes, and
performing a dark current eliminating process on the basis of the estimate dark current values.

\* \* \* \* \*